US012442030B2

(12) United States Patent
Grant et al.

(10) Patent No.: US 12,442,030 B2
(45) Date of Patent: Oct. 14, 2025

(54) METHODS AND SYSTEMS FOR DETERMINING ADAMTS13 ENZYME ACTIVITY

(71) Applicant: Laboratory Corporation of America Holdings, Burlington, NC (US)

(72) Inventors: Russell Philip Grant, Chapel Hill, NC (US); Christopher Michael Shuford, Mebane, NC (US); Meghan Norris Bradley, Mebane, NC (US)

(73) Assignee: Laboratory Corporation of America Holdings, Burlington, NC (US)

(*) Notice: Subject to any disclaimer, the term of this patent is extended or adjusted under 35 U.S.C. 154(b) by 0 days.

(21) Appl. No.: 18/598,286

(22) Filed: Mar. 7, 2024

(65) Prior Publication Data

US 2024/0271179 A1 Aug. 15, 2024

Related U.S. Application Data

(60) Division of application No. 17/088,778, filed on Nov. 4, 2020, now Pat. No. 11,959,124, which is a continuation of application No. 15/730,165, filed on Oct. 11, 2017, now Pat. No. 10,858,689.

(60) Provisional application No. 62/406,693, filed on Oct. 11, 2016.

(51) Int. Cl.
*C12Q 1/37* (2006.01)
*C12Q 1/00* (2006.01)
*G01N 33/68* (2006.01)

(52) U.S. Cl.
CPC ............... *C12Q 1/37* (2013.01); *C12Q 1/005* (2013.01); *G01N 33/6851* (2013.01); *G01N 2333/96486* (2013.01); *G01N 2560/00* (2013.01); *G01N 2800/226* (2013.01)

(58) Field of Classification Search
None
See application file for complete search history.

(56) References Cited

U.S. PATENT DOCUMENTS

| | | |
|---|---|---|
| 7,718,763 B2 | 5/2010 | Miyata et al. |
| 7,833,726 B2 | 11/2010 | Kato et al. |
| 8,623,612 B2 | 1/2014 | Varadi et al. |
| 8,637,268 B2 | 1/2014 | Chen et al. |
| 8,759,018 B2 | 6/2014 | Ono et al. |
| 8,932,820 B2 | 1/2015 | Althaus et al. |
| 9,110,085 B2 | 8/2015 | Varadi et al. |
| 9,297,815 B2 | 3/2016 | Igami et al. |
| 10,202,633 B2 | 2/2019 | Visentin et al. |
| 10,209,263 B2 | 2/2019 | Varadi et al. |
| 10,858,689 B2 | 12/2020 | Grant et al. |
| 11,959,124 B2 | 4/2024 | Grant et al. |
| 2008/0206787 A1 | 8/2008 | Wu et al. |
| 2012/0142036 A1 | 6/2012 | Chen et al. |
| 2019/0145989 A1 | 5/2019 | Varadi et al. |

FOREIGN PATENT DOCUMENTS

| | | |
|---|---|---|
| AU | 2009322367 B2 | 3/2015 |
| CA | 2745805 A1 | 6/2010 |
| CA | 2855498 A1 | 5/2013 |
| CN | 101613688 A | 12/2009 |
| CN | 102533937 A | 7/2012 |
| CN | 106771230 A | 5/2017 |
| CN | 108463729 A | 8/2018 |
| EP | 1779117 B1 | 5/2010 |
| EP | 1990421 B1 | 6/2012 |
| EP | 2776461 B1 | 2/2018 |
| EP | 3401685 A1 | 11/2018 |
| JP | 3944586 B2 | 7/2007 |
| JP | 4820192 B2 | 11/2011 |
| JP | 2012082210 A | 4/2012 |
| JP | 5221333 B2 | 6/2013 |
| JP | 2017153490 A | 9/2017 |
| JP | 6419576 B2 | 11/2018 |
| JP | WO2017119498 A1 | 12/2018 |
| KR | 101366724 B1 | 2/2014 |
| WO | 2006085441 A1 | 8/2006 |
| WO | 2018071502 A1 | 4/2018 |
| WO | 2018100053 A1 | 6/2018 |
| WO | 2018203086 A1 | 11/2018 |

OTHER PUBLICATIONS

U.S. Appl. No. 15/730,165, "Advisory Action", dated Jun. 19, 2020, 17 pages.
U.S. Appl. No. 15/730,165, "Final Office Action", dated Apr. 9, 2020, 25 pages.
U.S. Appl. No. 15/730,165, "Non-Final Office Action", dated Oct. 1, 2019, 17 pages.
U.S. Appl. No. 15/730,165, "Notice of Allowance", dated Jul. 29, 2020, 9 pages.
U.S. Appl. No. 17/088,778, "Non-Final Office Action", dated Jul. 19, 2023, 13 pages.
U.S. Appl. No. 17/088,778, "Notice of Allowance", dated Dec. 8, 2023, 11 pages.
Adcock et al., "Collection, Transport, and Processing Blood Specimens for Testing Plasma-Based Coagulation 3 Assays and Molecular Hemostasis Assays", Approved Guideline—Fifth Edition, vol. 28, No. 5, Jan. 2008, pp. 1-48.
Adcock et al., "Effect of 3.2% vs 3.8% Sodium Citrate Concentration on Routine Coagulation Testing", American Journal of Clinical Pathology, vol. 107, No. 1, Jan. 1997, pp. 105-110.
Angel et al., "Mass Spectrometry-Based Proteomics: Existing Capabilities and Future Directions", Chemical Society Reviews, vol. 41, No. 10, May 21, 2012, pp. 3912-3928.

(Continued)

*Primary Examiner* — Manjunath N Rao
*Assistant Examiner* — Jae W Lee
(74) *Attorney, Agent, or Firm* — Kilpatrick Townsend & Stockton LLP

(57) ABSTRACT

Disclosed are methods and systems for the analysis activity of enzyme disintegrin and metalloproteinase with a thrombospondin type 1 motif, member 13 (ADAMTS13) in a sample. The methods and systems disclosed herein can be useful for diagnosis of thrombotic thrombocytopenic purpura in a patient.

19 Claims, 4 Drawing Sheets

Specification includes a Sequence Listing.

(56) References Cited

OTHER PUBLICATIONS

AU Application No. 2017343623, "First Examination Report", dated Jan. 31, 2023, 5 pages.
AU Application No. 2017343623, "Second Examination Report", dated Mar. 15, 2023, 4 pages.
Bredehoft et al., "Quantification of Human Insulin-like Growth Factor-1 and Qualitative Detection of Its Analogues in Plasma Using Liquid Chromatography/Electrospray Ionisation Tandem Mass Spectrometry", Rapid Communications in Mass Spectrometry, vol. 22, No. 4, Feb. 28, 2008, pp. 477-485.
Broek et al., "Lc-ms-based Quantification of Intact Proteins: Perspective for Clinical and Bioanalytical Applications", Bioanalysis, vol. 7, No. 15, 2015, pp. 1974-1958.
CA Application No. 3,038,122, "Office Action", dated Dec. 23, 2021, 3 pages.
CA Application No. 3,038,122, "Office Action", dated Feb. 12, 2021, 4 pages.
CA Application No. 3,038,122, "Office Action", dated Feb. 6, 2020, 4 pages.
CA Application No. 3,038,122, "Office Action", dated Jan. 9, 2023, 5 pages.
CA Application No. 3,038,122, "Office Action", dated Jun. 13, 2024, 5 Pages.
Clarke et al., "Challenges in Implementing Clinical Liquid Chromatography-Tandem Mass Spectrometry Methods Seeing the Light at the End of the Tunnel", Journal of Mass Spectrometry, vol. 48, No. 7, Jun. 18, 2013, pp. 755-767.
CN Application No. 201780062891.5, "Office Action", dated May 15, 2023, 11 pages.
CN Application No. 201780062891.5, "Office Action", dated Oct. 31, 2022, 16 pages.
Connell et al., "Effect of Adamts13 Activity Turnaround Time on Plasma Utilization for Suspected Thrombotic Thrombocytopenia Purpura", Transfusion, vol. 56, No. 2, Feb. 2016, pp. 354-359.
EP Application No. 17791243.3, "Office Action", dated Aug. 8, 2024, 4 pages.
EP Application No. 17791243.3, "Office Action", dated Jun. 15, 2020, 4 pages.
EP Application No. 17791243.3, "Office Action", dated Aug. 25, 2021, 5 pages.
EP Application No. 17791243.3, "Office Action", dated Dec. 22, 2022, 5 pages.
Froehlich-Zahnd, "Evidence for a role of anti-ADAMTS13 autoantibodies despite normal ADAMTS13 5 activity in recurrent thrombotic thrombocytopenia purpura", Haematologica, vol. 97, No. 2, 2012, pp. 297-303.
Gottfried et al., "Prothrombin Time and Activated Partial Thromboplastin Time Can be Performed on the First Tube", American Journal of Clinical Pathology, vol. 107, No. 6, 1997, pp. 681-683.
Hovinga et al., "Survival and Relapse in Patients With Thrombotic Thrombocytopenia Purpura", Blood, vol. 115, No. 8, Feb. 2010, pp. 1500-1511.
Jannetto et al., "Effective Use of Mass Spectrometry in the Clinical Laboratory", Clinical Chemistry, vol. 62, No. 1, Jan. 2016, pp. 92-98.
Jin et al., "A Rapid Test for the Diagnosis of Thrombotic Thrombocytopeniarpura using Surface Enhanced Laser Desorption/ionization Time-of-Flight (SELDI-TOF)-Mass Spectrometry", Journal of Thrombosis and Haemostasis, vol. 4, No. 2, Feb. 1, 2006, pp. 333-338.
JP Application No. 2019-519274, "Office Action", dated Feb. 25, 2022, 10 pages.
JP Application No. 2019-519274, "Office Action", dated May 31, 2021, 13 pages.
JP Application No. 2019-519274, "Office Action", dated Oct. 11, 2023, 32 pages.
JP Application No. 2022-097187, "Office Action", dated Apr. 7, 2023, 1 page.
JP Application No. 2022-097187, "Office Action", dated Dec. 11, 2023, 2 pages.
Kadota et al., "Importance of Ionization Method in Mass Spectrometry", Journal of the Society for Biotechnology, vol. 91, No. 3, 2013, pp. 133-136.
Kato et al., "Novel Monoclonal Antibody-based Enzyme Immunoassay for Determining Plasma Levels of Adamts13 Activity", Transfusion, vol. 46, Aug. 2006, pp. 1444-1452.
Kokame, "Measurement of ADAMTS13", Japanese Journal of Thrombosis and Hemostasis, vol. 18, No. 3, 2007, pp. 234-240.
Kokame et al., "VWF73, A Region from D1596 to R1668 of Von Willebrand Factor Provides a Minimal Substrate for ADAMTS-13", Blood, 56th Annual Meeting of the American-Society-of-Hematology, vol. 103, No. 2, Jan. 15, 2004, pp. 607-612.
KR Application No. 10-2019-7013181, "Notice of Decision to Grant", dated Feb. 23, 2022, 3 pages.
KR Application No. 10-2019-7013181, "Office Action", dated Aug. 27, 2021, 6 pages.
Lammie et al., "Acquired Thrombotic Thrombocytopenia Purpura: Adamts13 Activity, Anti-adamts13 Autoantibodies and Risk Ofrecurrent Disease", Haematologica, vol. 93, No. 2, Feb. 2008, pp. 172-177.
Loirat et al., "Atypical Hemolytic Uremic Syndrome", Orphanet Journal of Rare Diseases, vol. 6, No. 1, Sep. 8, 2011, pp. 1-30.
Lotta et al., "Residual Plasmatic Activity of ADAMTS13 Is Correlated With Phenotype Severity in Congenital Thrombotic Thrombocytopenia Purpura", Blood, The journal of the American Society of Hematology, vol. 120, No. 2, Jul. 12, 2012, pp. 440-448.
Mannucci et al., "TTP and ADAMTS13: When Is Testing Appropriate?", Hematology, 2007, pp. 121-126.
McGlasson et al., "Drawing Specimens for Coagulation Testing: Is a Second Tube Necessary?", Clinical Laboratory Science Journal of the American Society for Medical Technology, vol. 12, No. 3, May/Jun. 1999, pp. 137-139.
Moake, "Thrombotic Thrombocytopenia Purpura (TTP) and Other Thrombotic Microangiopathies", Best Practice & Research Clinical Haematology, vol. 22, No. 4, Dec. 2009, pp. 567-576.
International Application No. PCT/US2017/056080, "International Preliminary Report on Patentability", dated Apr. 25, 2019, 9 pages.
International Application No. PCT/US2017/056080, "International Search Report and Written Opinion", dated Dec. 19, 2017, 14 pages.
Peyvandi et al., "Adamts13 and Anti-adamts13 Antibodies as Markers for Recurrence of Acquired 17 Thrombotic Thrombocytopenia Purpura During Remission", Haematologica, vol. 93, No. 2, Feb. 2008, pp. 232-239.
Reneke et al., "Prolonged Prothrombin Time and Activated Partial Thromboplastin Time Due to Underfilled 19 Specimen Tubes With 109 Mmol/l (3.2%) Citrate Anticoagulant", American Journal of Clinical Pathology, vol. 109, No. 6,, 1998, pp. 754-757.
Rieger et al., "Adamts13 Autoantibodies in Patients With Thrombotic Microangiopathies and Other Immunomediated Diseases", Blood, vol. 106, No. 4, Aug. 2005, pp. 1262-1267.
Sadler, "Von Willebrand Factor, Adamts13, and Thrombotic Thrombocytopeniarpura", Blood, vol. 112, No. 1, Jul. 1, 2008, pp. 11-19.
Scheiflinger et al., "Nonneutralizing IgM and IgG Antibodies to Von Wille Brand Factor-cleaving Protease 21 (Adamts-13) in a Patient With Thrombotic Thrombocytopenia Purpura", Blood, vol. 102, No. 9, Nov. 2003, pp. 3241-3243.
Scully, "Inhibitory Anti-adamts13 Antibodies: Measurement and Clinical Application", Blood Reviews, vol. 24, No. 1, Jan. 2010, pp. 11-16.
Shelat et al., "Inhibitory Autoantibodies Against Ad Amts-13 in Patients With Thrombotic Thrombocytopenia 22 Purpura Bind Adamts-13 Protease and May Accelerate It Clearance in Vivo", Journal of Thrombosis and Haemostasis, vol. 4, No. 8, Aug. 2006, pp. 1707-1717.
Tsai, "Pathophysiology of Thrombotic Thrombocytopenia Purpura", International Journal Hematology, vol. 91, No. 1, Jan. 2010, pp. 1-19.
Wang et al., "Hypochlorous Acid Generated by Neutrophils Inactivates Adamts13: An Oxidative Mechanism for Regulating Adamts13

(56) References Cited

OTHER PUBLICATIONS

Proteolytic Activity During Inflammation", Journal of Biological Chemistry, vol. 290, No. 3, Jan. 16, 2015, pp. 1422-1431.

Waters et al., "Ahus Caused by Complement Dysregulation: New Therapies on the Horizon", Pediatric Nephrology, vol. 26, No. 1, Jan. 2011, pp. 41-57.

Waugh, "An Overview of Enzymatic Reagents for the Removal of Affinity Tags", Protein Expression and Purification, vol. 80, 2011, pp. 283-293.

Yasuda, "Analysis of Protein/Peptide Hormone by Capillary LC-MS", Newsletter of Japan Society for Comparative Endocrinology, No. 107, 2002, pp. 29-35.

Zheng et al., "Effect of Plasma Exchange on Plasma Adamts13 Metalloprotease Activity, Inhibitor Level, and 26 Clinical Outcome in Patients With Idiopathic and Nonidiopathic Thrombotic Thrombocytopenia Purpura", Blood, vol. 103, No. 11, Jun. 1, 2004, pp. 4043-4049.

Zheng et al., "Pathogenesis of Thrombotic Microangiopathies", Annual Review of Pathology Mechanisms of Disease, vol. 3, Nov. 12, 2008, pp. 249-277.

FIG. 1

>sp|P04275|764-2813 Mature VWF - SEQ ID NO: 1

```
 764 SLSCRPPMVKLVCPADNLRAEGLECTKTCQNYDLECMSMGCVSGCLCPPGMVRHENRCVA  823
 824 LERCPCFHQGKEYAPGETVKIGCNTCVCQDRKWNCTDHVCDATCSTIGMAHYLTFDGLKY  883
 884 LFPGECQYVLVQDYCGSNPGTFRILVGNKGCSHPSVKCKKRVTILVEGGEIELFDGEVNV  943
 944 KRPMKDETHFEVVESGRYIILLLGKALSVVWDRHLSISVVLKQTYQEKVCGLCGNFDGIQ 1003
1004 NNDLTSSNLQVEEDPVDFGNSWKVSSQCADTRKVPLDSSPATCHNNIMKQTMVDSSCRIL 1063
1064 TSDVFQDCNKLVDPEPYLDVCIYDTCSCESIGDCACFCDTIAAYAHVCAQHGKVVTWRTA 1123
1124 TLCPQSCEERNLRENGYECEWRYNSCAPACQVTCQHPEPLACPVQCVEGCHAHCPPGKIL 1183
1184 DELLQTCVDPEDCPVCEVAGRRFASGKKVTLNPSDPEHCQICHCDVVNLTCEACQEPGGL 1243
1244 VVPPTDAPVSPTTLYVEDISEPPLHDFYCSRLLDLVFLLDGSSRLSEAEFEVLKAFVVDM 1303
1304 MERLRISQKWVRVAVVEYHDGSHAYIGLKDRKRPSELRRIASQVKYAGSQVASTSEVLKY 1363
1364 TLFQIFSKIDRPEASRITLLLMASQEPQRMSRNFVRYVQGLKKKKVIVIPVGIGPHANLK 1423
1424 QIRLIEKQAPENKAFVLSSVDELEQQRDEIVSYLCDLAPEAPPPTLPPDMAQVTVGPGLL 1483
1484 GVSTLGPKRNSMVLDVAFVLEGSDKIGEADFNRSKEFMEEVIQRMDVGQDSIHVTVLQYS 1543
1544 YMVTVEYPFSEAQSKGDILQRVREIRYQGGNRTNTGLALRYLSDHSFLVSQGDREQAPNL 1603
1604 VYMVTGNPASDEIKRLPGDIQVVPIGVGPNANVQELERIGWPNAPILIQDFETLPREAPD 1663
1664 LVLQRCCSGEGLQIPTLSPAPDCSQPLDVILLLDGSSSFPASYFDEMKSFAKAFISKANI 1723
1724 GPRLTQVSVLQYGSITTIDVPWNVVPEKAHLLSLVDVMQREGGPSQIGDALGFAVRYLTS 1783
1784 EMHGARPGASKAVVILVTDVSVDSVDAAADAARSNRVTVFPIGIGDRYDAAQLRILAGPA 1843
1844 GDSNVVKLQRIEDLPTMVTLGNSFLHKLCSGFVRICMDEDGNEKRPGDVWTLPDQCHTVT 1903
1904 CQPDGQTLLKSHRVNCDRGLRPSCPNSQSPVKVEETCGCRWTCPCVCTGSSTRHIVTFDG 1963
1964 QNFKLTGSCSYVLFQNKEQDLEVILHNGACSPGARQGCMKSIEVKHSALSVELHSDMEVT 2023
2024 VNGRLVSVPYVGGNMEVNVYGAIMHEVRFNHLGHIFTFTPQNNEFQLQLSPKTFASKTYG 2083
2084 LCGICDENGANDFMLRDGTVTTDWKTLVQEWTVQRPGQTCQPILEEQCLVPDSSHCQVLL 2143
2144 LPLFAECHKVLAPATFYAICQQDSCHQEQVCEVIASYAHLCRTNGVCVDWRTPDFCAMSC 2203
2204 PPSLVYNHCEHGCPRHCDGNVSSCGDHPSEGCFCPPDKVMLEGSCVPEEACTQCIGEDGV 2263
2264 QHQFLEAWVPDHQPCQICTCLSGRKVNCTTQPCPTAKAPTCGLCEVARLRQNADQCCPEY 2323
2324 ECVCDPVSCDLPPVPHCERGLQPTLTNPGECRPNFTCACRKEECKRVSPPSCPPHRLPTL 2383
2384 RKTQCCDEYECACNCVNSTVSCPLGYLASTATNDCGCTTTTCLPDKVCVHRSTIYPVGQF 2443
2444 WEEGCDVCTCTDMEDAVMGLRVAQCSQKPCEDSCRSGFTYVLHEGECCGRCLPSACEVVT 2503
2504 GSPRGDSQSSWKSVGSQWASPENPCLINECVRVKEEVFIQQRNVSCPQLEVPVCPSGFQL 2563
2564 SCKTSACCPSCRCERMEACMLNGTVIGPGKTVMIDVCTTCRCMVQVGVISGFKLECRKTT 2623
2624 CNPCPLGYKEENNTGECCGRCLPTACTIQLRGGQIMTLKRDETLQDGCDTHFCKVNERGE 2683
2684 YFWEKRVTGCPPFDEHKCLAEGGKIMKIPGTCCDTCEEPECNDITARLQYVKVGSCKSEV 2743
2744 EVDIHYCQGKCASKAMYSIDINDVQDQCSCCSPTRTEPMQVALHCTNGSVVYHEVLNAME 2803
2804 CKCSPRKCSK
```

VWF A2 Domain
1459-1668
(SEQ ID NO: 2)

ADAMTS13
cleavage site
1605-1606

ADAMTS13
exosite
1660-1668

FIG. 2 vWF A2 Domain

VWF A2 Domain
SEQ ID NO: 2

ADAMTS13 cleavage site

ADAMTS13 exosite

```
                                                    DLAPEAPPPTLPPDMAQVTVGPGLL  1483
1484  GVSTLGPKRNSMVLDVAFVLEGSDKIGEADFNRSKEFMEEVIQRMDVGQDSIHVTVLQYS  1543
1544  YMVTVEYPFSEAQSKGDILQRVREIRYQGGNRTNTGLALRYLSDHSFLVSQGDREQAPNL  1603
1604  TGNPASDEIKRLPGDIQVVPIGVGPNANVQELERIGWPNAPILIQDFETLPREAPD      1663
1664  (YM)KVLQR
``` vWF73 Substrate
(8085.1 Da)
SEQ ID NO: 3

```
                                                     DREQAPNL 1603
1604 VYMVTGNPASDEIKRLPGDIQVVPIGVGPNANVQELERIGWPNAPILIQDFETLPREAPD 1663
1664 LVLQR  (SEQ ID NO: 3)
```

ADAMTS13
cleavage site

ADAMTS13
exosite

DREQAPNLVY
(SEQ ID NO: 4)

METHODS AND SYSTEMS FOR DETERMINING ADAMTS13 ENZYME ACTIVITY

CROSS REFERENCE TO RELATED APPLICATIONS

This application is a divisional of U.S. patent application Ser. No. 17/088,778, filed Nov. 4, 2020, which issued Apr. 16, 2024, as U.S. Pat. No. 11,959,124, which is a continuation of U.S. patent application Ser. No. 15/730,165, filed Oct. 11, 2017, which issued Dec. 8, 2020, as U.S. Pat. No. 10,858,689, and which claims the benefit of U.S. Provisional Application No. 62/406,693, filed Oct. 11, 2016. The contents of all of the above patents and applications are incorporated by reference in their entirety herein.

FIELD OF THE INVENTION

The present invention relates to methods and systems for determining the activity of ADAMTS13 (a disintegrin and metalloproteinase with a thrombospondin type 1 motif, member 13), which can be useful for diagnosis of thrombotic thrombocytopenic purpura in a patient.

BACKGROUND

Thrombotic thrombocytopenic purpura (TTP) is a blood disorder that causes blood clots to form in small blood vessels. This leads to a low platelet count (thrombocytopenia), while the clots can damage many organs, including the kidneys, heart and brain. Without treatment, the fatality rate for TTP is about 90%. The typical treatment is plasma exchange, which reduces the fatality rate to about 10% at six months.

Most cases of TTP arise from reduced activity of ADAMTS13, which is a protease that specifically cleaves blood glycoprotein von Willebrand factor (vWF). ADAMTS13 specifically cleaves vWF between tyrosine-1605 and methionine-1606 under circulatory conditions of high shear stress. ADAMTS13 has also been referred to as von Willebrand factor-cleaving protease. Both congenital and acquired (autoimmune) deficiency of ADAMTS13 activity are characterized by the presence of unusually large vWF factor multimers that are more platelet adhesive than smaller multimers found in normal plasma, resulting in TTP.

Most TTP cases are idiopathic and are associated with antibodies to ADAMTS13 that reduce circulating functional enzyme levels through increased clearance of ADAMTS13 from circulation or direct inhibition of ADAMTS13 proteolytic activity, although antibodies to ADAMTS13 are not usually detected in patients with congenital deficiency. Studies have shown that quantitative immunoassays for IgG-specific autoantibodies to ADAMTS13 are more sensitive than the functional (i.e., inhibition) assays for detecting antibodies against ADAMTS13.

Symptomatically, TTP is characterized by thrombotic microangiopathy (TMA), the formation of blood clots in small blood vessels throughout the body, which can lead to microangiopathic hemolytic anemia and thrombocytopenia. Measurement of ADAMTS13 activity can play a role in differentiating TTP from a number of clinically similar conditions that have different underlying causes. These syndromes, which can be associated with pregnancy, organ transplantation and certain medications, generally do not exhibit significantly reduced ADAMTS13 activity levels. Hemolytic Uremic Syndrome (HUS) is clinically similar to TTP, but is associated with acute renal failure. Diarrhea-associated HUS accounts for most of cases and is usually caused by infection with Shiga-toxin-producing *Escherichia coli* (O157:H7). Diarrhea-negative or atypical HUS (aHUS) is thought to be caused by uncontrolled complement activation occurring in both children and adults and shares many of the clinical features of TTP; however, aHUS is not associated with severe reduction (i.e., <10%) of ADAMTS13 activity. Indeed, congenital ADAMTS13 activity deficiency, also referred to as Upshaw-Schulman syndrome, is an autosomal recessive disorder that is associated with ADAMTS13 activity levels below 10% of normal ADAMTS13 activity. Disease classification based on clinical features alone can be unreliable and can result in inappropriate treatment or delay in the initiation of effective treatment. Therefore, in patients exhibiting laboratory evidence of thrombocytopenia and microangiopathic hemolysis, the measurement of ADAMTS13 activity can be invaluable in differentiating TTP from other clinically similar conditions.

Generally, lifesaving Total Plasma Exchange (TPE) therapy is initiated before ADAMTS13 activity testing when TTP is suspected based on clinical presentation because of the acuity and severity of the of the symptoms. In many cases TPE will be stopped if a normal ADAMTS13 activity test result is obtained. As such, the sooner ADAMTS13 test results are obtained, the sooner TPE therapy can be stopped, which 1) reduces the cost associated with (needless) TPE therapy and 2) allows the clinician to focus on alternative causes for the symptoms and thus appropriate therapies. (Connell, N. T. et al. *Transfusion* 2016, 56 (2), 354-359).

Thus, there is a need for improved lab tests to measure ADAMTS13 activity in samples from individuals at risk for or suspected of having TTP. There is a need for improved lab tests that are more cost-efficient, thereby allowing more frequent testing and also provide clinicians testing results sooner.

SUMMARY

The present invention provides methods and systems for determining activity of ADAMTS13, which can be useful for diagnosis of TTP in a patient. In certain embodiments, the invention comprises a method to measure ADAMTS13 by mass spectrometry and/or liquid chromatography-tandem mass spectroscopy (LC-MS/MS).

For example, in some embodiments, the invention comprises a method for determining ADAMTS13 enzyme activity in a sample, comprising: (a) incubating the sample with an exogenous peptide substrate for ADAMTS13 under conditions allowing for enzymatic cleavage of the exogenous peptide substrate by ADAMTS13 to produce an enzymatic cleavage product; (b) ionizing the enzymatic cleavage product to generate a multiply charged gas-phase ion of the cleavage product; and (c) analyzing said multiply charged gas-phase ion by mass spectrometry to determine the presence or amount of enzymatic cleavage product in the sample, wherein the presence or the amount of the product of the enzymatic cleavage product in the sample is indicative of the presence or the amount of the activity of ADAMTS13 in the sample.

In certain embodiments, the invention may comprise a method for determining an amount of activity of ADAMTS13 in a sample, comprising: (a) incubating the sample with a synthetic peptide substrate for ADAMTS13 and an isotopically labelled equivalent of a product peptide to the sample under conditions allowing for enzymatic cleavage of the synthetic peptide substrate by ADAMTS13; (b) terminating the enzymatic cleavage in the sample being incubated; (c) partially purifying an enzymatic cleavage product and the internal standard from other components of the sample using liquid chromatography or another purification technique; and (d) analyzing the partially purified enzymatic cleavage product and the standard by mass spectrometry to determine the amount of enzymatic cleavage product and the internal standard in the sample, wherein a ratio of the determined amounts of the enzymatic cleavage product and the internal standard is indicative of the amount of activity of ADAMTS13 in the sample.

In other embodiments, the invention may comprise a system for determining activity of ADAMTS13 in a sample, the system comprising: (a) a station for incubating the sample with an exogenous peptide substrate for ADAMTS13 under conditions allowing for enzymatic cleavage of the exogenous peptide substrate by ADAMTS13 to generate an enzymatic cleavage product; (b) a station for ionizing the enzymatic cleavage product to generate a multiply charged gas-phase ion of said cleavage product; and (c) a station for analyzing the multiply charged gas phase ion by mass spectrometry to determine the presence and/or amount of the enzymatic cleavage product in the sample, wherein the amount of the enzymatic cleavage product is indicative of the activity of ADAMTS13 in the sample. In some embodiments, the system may further comprise a station for partially purifying the enzymatic cleavage product. In an embodiment, the system may comprise a station for chromatographically separating the enzymatic cleavage product using liquid chromatography.

Both the methods and the systems of the invention may include various embodiments. For example, in certain embodiments, the method may comprise, after the incubation step but prior to the ionizing step, a step of partially purifying the enzymatic cleavage product, such that the ionizing step is performed on the partially purified enzymatic cleavage product. In certain embodiments, the system may comprise a station for performing such a step.

In an embodiment, the step of partially purifying the enzymatic cleavage product comprises centrifugation, and the ionizing step is performed on a supernatant comprising the enzymatic cleavage product. Additionally and/or alternatively, the step of partially purifying the enzymatic cleavage product may comprise liquid chromatography to generate an eluent comprising the enzymatic cleavage product and the ionizing step is performed on the eluent.

Additionally and/or alternatively, the step of partially purifying the enzymatic cleavage product comprises capillary electrophoresis to generate an eluent comprising the enzymatic cleavage product and the ionizing step is performed on the eluent. Additionally and/or alternatively, the step of partially purifying the enzymatic cleavage product comprises solid phase extraction to generate an eluent comprising the enzymatic cleavage product and the ionizing step is performed on the eluent. Additionally and/or alternatively, the step of partially purifying the enzymatic cleavage product comprises filtration to generate an eluent comprising the enzymatic cleavage product and the ionizing step is performed on the eluent. Additionally and/or alternatively, the step of partially purifying the enzymatic cleavage product comprises filtration to generate a retained fraction comprising the enzymatic cleavage product and the ionizing step is performed on the retained fraction. Additionally and/or alternatively, the step of partially purifying the enzymatic cleavage product comprises the use of affinity enrichment of the enzymatic cleavage product and the ionizing step is performed on the affinity enriched enzymatic cleavage product. In certain embodiments, the affinity enrichment technique uses an immobilized metal affinity resin. For example, in various embodiments, the affinity enrichment technique may utilize an antibody or a fragment of an antibody, such as a Fab fragment. Or, the affinity enrichment technique may utilize streptavidin. Or, the affinity enrichment technique may utilize protein-G, or protein-A. Or, the affinity enrichment technique may utilize an aptamer.

In certain embodiments, the methods and systems include a step for terminating the incubation prior to analysis and/or partial purification. For example, in certain embodiments, the methods and/or systems may include a step (or a station for performing such a step) of terminating the enzymatic cleavage in the sample being incubated. In certain embodiments, the terminating step may comprise adding a precipitating reagent to the sample being incubated. A variety of precipitating reagents may be used. Thus, in alternate embodiments, the precipitating reagent may comprise methanol, and/or acetonitrile, and/or acetone, and/or 2-propanol, and/or sulfate, and/or trichloroacetic acid, and/or perchloric acid. In certain embodiments, termination of the reaction is performed by changing the pH to a range outside of the range suitable for the enzyme to be functional. For example, the terminating step may comprise adjusting the pH of the sample being incubated below pH 5, or alternatively to above pH 9. In certain embodiments, the terminating step may comprise adjusting the temperature to a range outside of the range suitable for the enzyme to be functional. For example, the terminating step may comprise heating the sample being incubated to a temperature above 50 degrees centigrade or alternatively, cooling the sample being incubated to a temperature below 15 degrees centigrade. In certain embodiments, the terminating step may comprise adding an inhibitor of ADAMTS13 to the sample being incubated. For example, in one embodiment, the inhibitor may be ethylenediaminetetraacetic acid (EDTA).

The substrate used in the reaction is designed to allow for measurement of the activity of ADAMTS13. In certain embodiments, the substrate includes the von Willebrand Factor A2 Domain (vWF A2 Domain), or a portion thereof. In an embodiment, the exogenous peptide substrate has at least 70% sequence identity to vWF amino acid sequence or a portion thereof. In certain embodiments, the substrate comprises a functional ADAMTS13 cleavage site. In an embodiment, the substrate comprises a functional ADAMTS13 exosite. In an embodiment, the substrate comprises an exogenous peptide. The exogenous peptide may be a synthetic peptide. For example, in an embodiment, the exogenous substrate is a synthetic peptide having at least 70% sequence similarity to amino acid sequence of vWF73 (SEQ ID NO: 3). In an embodiment, the peptide is SEQ ID NO: 3.

In some embodiments, the peptide substrate comprises one or more affinity tags. In some embodiments, the one or more affinity tags are selected from the group consisting of: MYC-tag, FLAG-tag, polyHis-tag, or GST-tag. In some embodiments, the one or more affinity tags contain the epitope for an antibody. Additionally and/or alternatively, the exogenous peptide substrate may comprise one or more non-natural amino acids. In certain embodiments, the one or more non-natural amino acids are biotinylated. In certain embodiments, the one or more non-natural amino acids are stable isotopically labeled amino acids.

The substrate is, upon incubation with ADAMTS13, cleaved into two smaller peptides. The resulting products depends on the peptide used as an exogenous substrate. For example, using the exogenous substrate of SEQ ID NO: 3 (or a substrate having additional or fewer amino acids at the N-terminal end) the enzymatic cleavage product may comprise a peptide having a sequence of DREQAPNLVY (SEQ ID NO: 4). It is contemplated that other products may be formed where there are additional amino acids on the C-terminal end of the substrate peptide.

The ionization step results in the formation of multiply charged ions. In certain embodiments, the ionization step includes ionizing the enzymatic cleavage product using an ionization technique, such as electrospray ionization, atmospheric pressure chemical ionization or atmospheric pressure photoionization. An ionization technique can be selected from the group consisting of: electrospray ionization, atmospheric pressure chemical ionization and atmospheric pressure photoionization.

The analyzing step allows for characterization and quantification of the multiply charged ions formed in the ionization step. In certain embodiments, the analyzing step includes determining the specific activity of the ADAMTS13. In some embodiments, the analyzing step uses tandem mass spectrometry. Using the substrate of SEQ ID NO: 3 to generate the product of SEQ ID NO: 4, the analyzing step may, in certain embodiments, use ions having an m/z selected from the group consisting of 602.8±2, 182.1±2, 281.1±2, 462.7±2, 512.3±2, 600.3±2, 605.3±2, 811.4±2, 924.5±2 and 1023.5±2.

As noted above, the methods and systems of the invention may employ an internal standard. In some embodiments, the internal standard is added prior to the ionization step. Alternatively, the internal standard may be added concurrently with the substrate. In yet other embodiments, the internal standard may be added to the sample prior to the incubation step. Or, the internal standard may be added to the sample being incubated. In certain embodiments, the presence or amount of the internal standard is determined along with the presence or amount of the enzymatic cleavage product. In certain embodiments, the ratio between the determined amount of the internal standard and the determined amount of the enzymatic cleavage product is indicative of the amount of the enzymatic cleavage product formed. In some embodiments, the ratio between the determined amount of the internal standard and the determined amount of the enzymatic cleavage product is indicative of the amount of activity (e.g., the specific activity) of ADAMTS13 in the sample.

A variety of internal standards may be used. In some embodiments, the internal standard is a different peptide than the cleavage product. In some other embodiments, however, the internal standard is an isotopically labelled equivalent of the enzymatic cleavage product.

A variety of biological samples may be used. In certain embodiments, the sample is a biological fluid obtained from a patient. For example, the biological fluid may be plasma or serum. Or other types of biological fluids (e.g., saliva, sputum, sweat, cerebral spinal fluid) may be used.

In some embodiments, the methods and systems may employ, either before or after the optional partial purification step, but after the termination step, a step (and/or a station for performing such a step) of modifying the molecular structure of the enzymatic cleavage in the sample being incubated. For example, in certain embodiments, the modifying step may comprises further hydrolyzing the enzymatic cleavage product. For example, the hydrolysis may be performed using an enzyme. In certain embodiments, the enzyme may be one of trypsin, pepsin, or LysC. Or, other enzymes may be used. In other embodiments, the hydrolysis may be performed using a chemical reagent. For example, the chemical reagent may be one of formic acid or cyanogen bromide. Or, other chemical reagents may be used. In some embodiments, the enzymatic cleavage product may be derivatized. For example, in some embodiments, the derivatization is enzymatically catalyzed. Or, the derivatization may comprise a chemical addition.

These and other embodiments are described herein.

BRIEF DESCRIPTION OF THE FIGURES

The invention may be better understood by reference to the following non-limiting figures. The figures are intended to illustrate certain embodiments and/or features of the invention, and to supplement any description(s) of the invention. The figures do not limit the scope of the invention, unless the written description expressly indicates that such is the case.

FIG. 1 shows partial amino acid sequence of vWF (SEQ ID NO: 1) and A2 domain of VWF (SEQ ID NO: 2) with cleavage site for ADAMTS13 underlined and the exosite shown in italics.

FIG. 2 shows the amino acid sequence for A2 domain of vWF (SEQ ID NO: 2) with cleavage site for ADAMTS13 underlined and the exosite shown in italics.

DETAILED DESCRIPTION

The following description recites various aspects and embodiments of the present invention. No particular embodiment is intended to define the scope of the invention. Rather, the embodiments merely provide non-limiting examples of various methods and systems that are at least included within the scope of the invention. The description is to be read from the perspective of one of ordinary skill in the art; therefore, information well known to the skilled artisan is not necessarily included.

Abbreviations

Various abbreviations may be used in the application. In most, if not all, instances, the meanings of such abbreviations are known to those of skill in the art. These abbreviations include the following abbreviations, whose meanings are provided. Other abbreviations are defined herein.

Figure 3:
FIG. 3 shows the amino acid sequence of a synthetic polypeptide substrate for ADAMTS13 (SEQ ID NO: 3) based on vWF amino acid sequence, with ADAMTS13 cleavage site underlined and the exosite shown in italics and the amino acid sequence of the resultant cleavage product ("DRE peptide"; SEQ ID NO: 4).

ADAMTS13=a disintegrin and metalloproteinase with a thrombospondin type 1 motif, member 13 enzyme DRE=a 10 amino acid polypeptide, which can be formed as a product of enzymatic cleavage of vWF73, having the sequence DREQAPNLVY (SEQ ID NO: 4); illustrated in FIG. 3.

LC=liquid chromatography

LC-MS/MS=liquid chromatography–tandem mass spectrometry

MS=mass spectrometry

MS/MS=tandem mass spectrometry

TTP=Thrombotic thrombocytopenia purpura vWF=von Willebrand factor protein (glycoprotein)

vWF73=73 amino acid residue polypeptide (illustrated in FIG. 3) derived from the natural amino acid sequence of vWF residues Asp-1596 through Arg-1668

Definitions

The following terms, unless otherwise indicated, shall be understood to have the following meanings:

As used herein, the terms "a," "an," and "the" can refer to one or more unless specifically noted otherwise.

Throughout this application, the term "about" is used to indicate that a value includes the inherent variation of error for the device, the method being employed to determine the value, or the variation that exists among the study subjects.

As used herein, the terms "enzyme activity" or "enzymatic activity" refer to a measure of ADAMTS13 specific activity as compared to either a reference standard or a calibration curve of normal pooled plasma. The terms can be used in conjunction with the term "amount" or "level."

As used herein, the term "exosite" refers to the portion of the ADAMTS13 substrate which the enzyme recognizes to initiate cleavage. Substrates without the exosite generally will not be recognized as efficiently by the enzyme (Kokame et al., *Blood*, 2004, 103:607-612).

As used herein, the terms "subject," "individual," and "patient" are used interchangeably. The use of these terms does not imply any kind of relationship to a medical professional, such as a physician.

As used herein, the phrase "liquid chromatography" or "LC" is used to refer to a process for the separation of one or more molecules or analytes in a sample from other analytes in the sample. LC involves the slowing of one or more analytes of a fluid solution as the fluid uniformly moves through a column of a finely divided substance. The slowing results from the distribution of the components of the mixture between one or more stationery phases and the mobile phase. LC includes, for example, reverse phase liquid chromatography (RPLC) and high pressure liquid chromatography (HPLC). In some cases, LC refers to reverse phase LC with a hydrophobic stationary phase in combination with a mobile phase comprised of water and/or water-miscible organic solvents, such as methanol or acetonitrile. In some case, LC may refer to ion exchange chromatography, affinity chromatography, normal phase liquid chromatography, or hydrophilic interaction chromatography.

As used herein the term "capillary electrophoresis" (CE) refers to a process for the separation of one or more molecules or analytes in a sample from other analytes in the sample, based on their ionic mobility in an electrolyte solution while exposed to an electric field. CE includes, for example, capillary zone electrophoresis (CZE).

As used herein, the term "separate" or "purify" or the like are not used necessarily to refer to the removal of all materials other than the analyte of interest from a sample matrix. Instead, in some embodiments, the terms are used to refer to a procedure that enriches the amount of one or more analytes of interest relative to one or more other components present in the sample matrix. In some embodiments, a "separation" or "purification" may be used to remove or decrease the amount of one or more components from a sample that could interfere with the detection of the analyte, for example, by mass spectrometry.

As used herein, the term "mass spectrometry" or "MS" refers to a technique for the identification and/or quantitation of molecules in a sample. MS includes ionizing the molecules in a sample to form charged molecules (ions) in gas phase; separating the charged molecules according to their mass-to-charge ratio; and detecting the charged molecules. MS allows for both the qualitative and quantitative detection of molecules in a sample. The molecules may be ionized and detected by any suitable means known to one of skill in the art. The phrase "tandem mass spectrometry" or "MS/MS" is used herein to refer to a technique for the identification and/or quantitation of molecules in a sample, wherein multiple rounds of mass spectrometry occur, either simultaneously using more than one mass analyzer or sequentially using a single mass analyzer. As used herein, a "mass spectrometer" is an apparatus that includes a means for ionizing molecules and detecting charged molecules.

As used herein, "electrospray ionization" or "ESI" refers to a technique used in mass spectrometry to ionize molecules in a sample while avoiding fragmentation of the molecules. The sample is dispersed by the electrospray into a fine aerosol. The sample will typically be mixed with a solvent, usually a volatile organic compound (e.g., methanol or acetonitrile) mixed with water. The aerosol is then transferred to the mass spectrometer through an orifice, which can be heated to aid further solvent evaporation from the charged droplets and, ultimately, from gas-phase ions of the molecules in the sample.

As used herein, the term "stable isotopically labeled" encompasses the process of enriching a molecule with a non-radioactive isotope of a given atom so as to alter the average mass of said atom within a molecule and thereby alter the average mass of said molecule. Generally, this is accomplished by replacing the light isotopes more frequently found in nature and in natural molecules (e.g., carbon-12 or nitrogen-14), with the less common heavy isotopes (e.g., carbon-13 or nitrogen-15).

As used herein, a "quadrupole analyzer" is a type of mass analyzer used in MS. It consists of four circular rods (two pairs) that are set highly parallel to each other. The quadrupole may be in triple quadrupole format as is known in the art. The quadrupole analyzer is the component of the instrument that organizes the charged particles of the sample based on their mass-to-charge ratio. One of skill in the art would understand that use of a quadrupole analyzer can lead to increased specificity of results. One pair of rods is set at a positive electrical potential and the other set of rods is at a negative potential. To be detected, an ion must pass through the center of a trajectory path bordered and parallel to the aligned rods. When the quadrupoles are operated at a given amplitude of direct current and radio frequency voltages, only ions of a given mass-to-charge ratio will resonate and have a stable trajectory to pass through the quadrupole and be detected. As used herein, "positive ion mode" refers to a mode wherein positively charged ions are detected by the mass analyzer, and "negative ion mode" refers to a mode wherein negatively charged ions are detected by the mass analyzer. For "selected ion monitoring" or "SIM," the amplitude of the direct current and the radio frequency voltages are set to observe only a specific mass.

The term "centrifugation" refers to a process that involves the application of the centripetal force for the sedimentation of heterogeneous mixtures with a centrifuge. The increase the effective gravitational force on a sample, for example, contained in a tube, to more rapidly and completely cause the precipitate (pellet) to gather on the bottom of the tube. The remaining solution is termed "supernatant."

TTP is a known, relatively rare blood disorder, which is discussed in more detail elsewhere in this document, for example, in the section "Background of the Invention."

The terms "substrate" or "enzyme substrate" are used herein to refer to a material on which an enzyme acts.

The term "exogenous" substrate is a substrate originating from outside the sample. In certain embodiments, the "exogenous" substrate is a "synthetic" substrate.

The term "synthetic" is used here to refer to a man-made molecule, for example, produced in a laboratory or other similar facility. This will encompass both chemical synthesis as well as recombinant molecular techniques (i.e., expression from a recombinant nucleic acid construct).

The term "sequence" can be used to refer to the order of amino acids in a polypeptide, which can also be described as "primary structure," or to a polypeptide molecule, such as a polypeptide with a particular order of amino acids.

"Sequence identity" or "sequence similarity" in the context of two or more amino acid sequences, refer to two or more sequences or subsequences that are the same or have a specified percentage of amino acids that are the same (for example, 60%, 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region. Various tools for measuring sequence similarity are available, such as protein BLAST available from National Center for Biotechnology Information, U.S. National Library of Medicine, Bethesda, Maryland, USA. For sequence comparison, typically one sequence acts as a reference sequence, to which test sequences are compared. When using a sequence comparison algorithm, test and reference sequences are entered into a computer, subsequence coordinates are designated, if necessary, and sequence algorithm program parameters are designated. Default program parameters can be used, or alternative parameters can be designated. The sequence comparison algorithm then calculates the percent sequence identities for the test sequences relative to the reference sequence, based on the program parameters.

The terms "cleavage," "enzyme cleavage" or "enzymatic cleavage" are used herein to refer to a process or a result of enzymatic hydrolysis of a polypeptide caused by an enzyme protease (peptidase or proteinase).

The term "cleavage site" is used herein to refer to a location of cleavage by a protease in a polypeptide. The term "cleavage site" encompasses and may be used to denote "specific cleavage site," meaning a cleavage site in a polypeptide for which a protease is specific.

The term "cleavage product" is used herein to refer to a polypeptide resulting from enzymatic cleavage by a protease.

von Willebrand factor (vWf) is a large multimeric glycoprotein present in blood plasma and produced constitutively as ultra-large vWF in endothelium (in the Weibel-Palade bodies), megakaryocytes (α-granules of platelets), and subendothelial connective tissues. The basic vWF monomer is a 2050-amino acid protein containing a number of specific domains with specific functions. vWF monomers are post-translationally N-glycosylated, arranged into dimers in the endoplasmic reticulum and into multimers in the Golgi apparatus by crosslinking of cysteine residues via disulfide bonds. vWF multimers can contain over 80 vWF monomers. vWF main known function is binding other proteins, in particular factor VIII, and it is known to be important in platelet adhesion to wound sites.

ADAMTS13 is a metalloproteinase also known as von Willebrand factor-cleaving protease (vWFCP). It is a zinc-containing metalloprotease enzyme that cleaves vWF. It is secreted in blood and degrades large vWf multimers, decreasing their activity.

Methods for Determining the Presence or Amount of ADAMTS13 Activity

The invention may be embodied in a variety of ways. In certain embodiments, the invention comprises a method to measure ADAMTS13 activity by mass spectrometry. In some embodiments tandem MS/MS is used. In some embodiments, ADAMTS13 activity is measured by LC-MS/MS. Also included are systems for measuring ADAMTS13 activity.

FIGS. 1 and 2 shows partial amino acid sequence of vWF (SEQ ID NO: 1 in FIG. 1; SEQ ID NO: 2 in FIGS. 1 and 2), with cleavage site for ADAMTS13 underlined. The methods described herein may employ a portion of the vWF A2 Domain (residues D1459-L1664) as the substrate (SEQ ID NO: 2 shown in FIG. 2 and in bold font in FIG. 1). Also shown is ADAMTS13 cleavage site (underlined) (residues 1605-1606) and the exosite (italics) (residues 1660-1668) (see FIGS. 1 and 2). FIG. 3 shows the substrate peptide having the ADAMTS13 cleavage site (underlined font) and the resultant N-terminal peptide product DREQAPNLVY (SEQ ID NO: 4) (i.e., "DRE peptide") that is a product of ADAMTS13 cleavage of the substrate polypeptide shown in FIG. 3.

Figure 4:
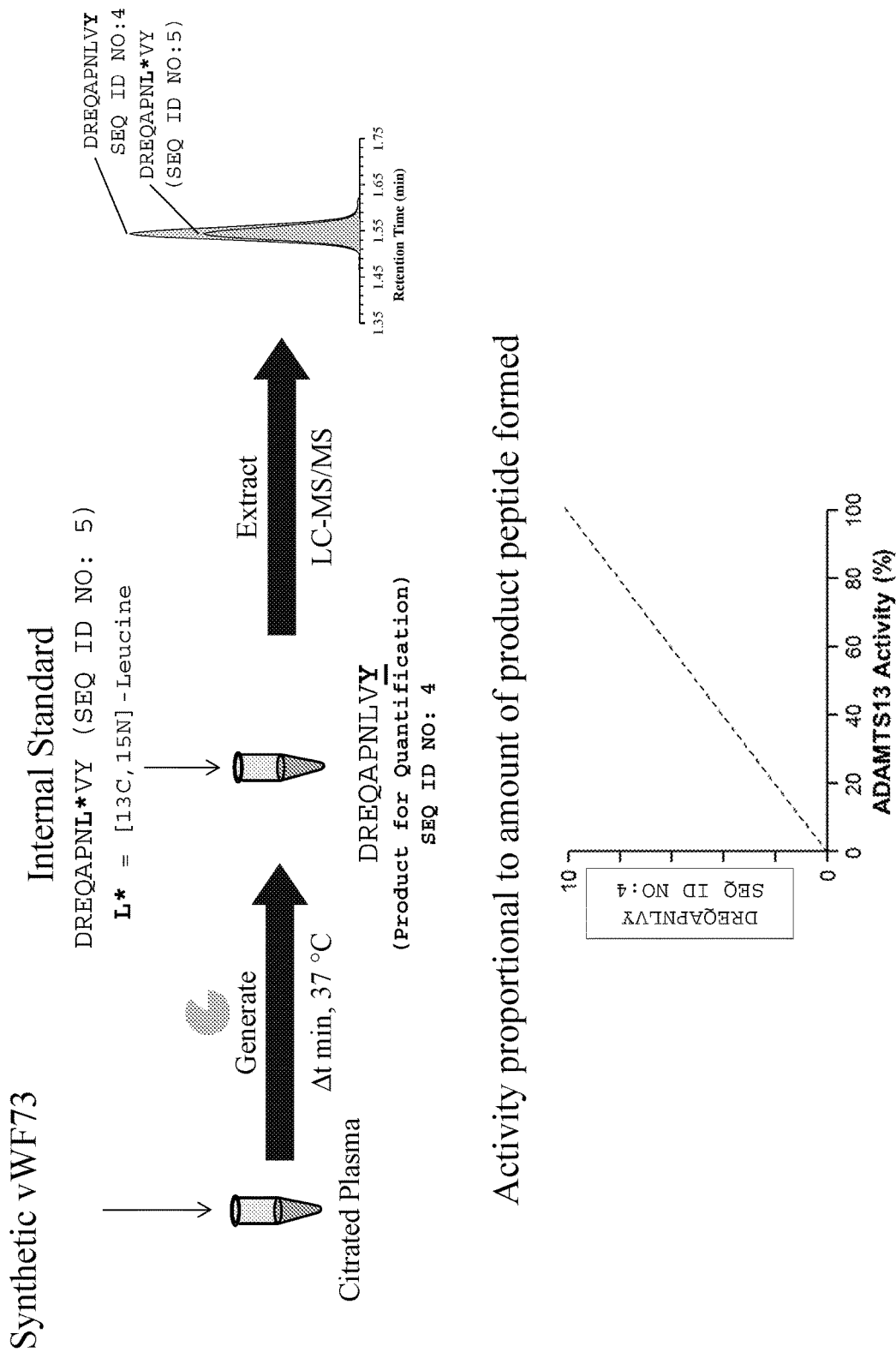
FIG. 4 shows an overview of a workflow for assay of ADAMTS13 activity by detection of the DRE peptide (SEQ ID NO: 4) by LC-MS/MS according to an embodiment of the present invention. Internal standard (SEQ ID NO:5) is also shown.

In certain embodiments, the present invention is performed as schematically illustrated in FIG. 4. An exemplary embodiment of the invention is a method for determining activity of ADAMTS13 in a sample, which may include the steps of incubating the sample with a synthetic peptide substrate for ADAMTS13 (SEQ ID NO: 3) under conditions allowing for enzymatic cleavage of the synthetic peptide substrate by ADAMTS13 to generate a DRE peptide (SEQ ID NO: 4), optionally, terminating the enzymatic cleavage in the sample being incubated; optionally, chromatographically separating the enzymatic cleavage product using liquid chromatography; and analyzing the enzymatic cleavage product by mass spectrometry to determine presence or amount of enzymatic cleavage product in the sample. The presence or the amount of the product of the enzymatic cleavage product in the sample is indicative of the presence or the amount of the activity of ADAMTS13 in the sample. As shown in FIG. 4, the method may employ an internal standard, such as DRE peptide, stable isotopically labeled with, for example, [$^{13}$C, $^{15}$N]-Leucine (SEQ ID NO:5). As is known, other types of internal standard may be employed. For example, the internal standard may be unlabeled but have a different amino acid sequence, or another amino acid in the peptide may be labeled. The internal standard, as well as the substrate peptide(s) may be made by chemical synthesis or recombinant methods.

Thus, in certain embodiments, ADAMTS13 activity may be determined by incubating a plasma sample obtained from a patient with a synthetic polypeptide substrate based on the sequence shown in FIG. 1 (SEQ ID NO: 1). The synthetic substrate may be smaller than the sequence shown in FIG. 1. In an embodiment, the synthetic substrate, termed vWF73, is a 73 amino acid residue polypeptide shown in FIG. 3 based on the partial amino acid of vWF, residues Asp-1596 through Arg-1668 (SEQ ID NO: 3). vWF73 possesses the cleavage site Tyr-1605/Met-1606. The synthetic substrate does not necessarily possess the same sequence as the sequence shown in FIG. 3 and in bold in FIG. 1; variations and modifications of the sequence are possible. In some embodiments, the substrate may have amino acid residue sequences not shown in FIG. 1 (SEQ ID NO: 1), and/or may include additional sequences such as the inclusion of an affinity tag or non-native amino acids. Examples of this might include a MYC tag (EQKLISEEDL—SEQ ID NO: 6), a FLAG tag (DYKDDDDK—SEQ ID NO: 7), a polyHIS tag (HHHHHH—SEQ ID NO: 8), a Glutathione S-transferase tag or a biotinylated amino acid. However, a cleavage site for ADAMTS13 is present in the synthetic substrate. In alternate embodiments, the synthetic substrate has at least 70%, 75%, 80%, 85%, 90% or 95% sequence similarity to vWF73 sequence.

Cleavage of the synthetic substrate by ADAMTS13 results in a detectable product. For example, upon cleavage of vWF73 in vitro, a 10 amino acid residue peptide is formed from the N-terminus of the substrate having the sequence DREQAPNLVY (SEQ ID NO:4), which is termed "DRE product." In an embodiment, ADAMTS13 activity is proportional to the amount of DRE product created during the incubation period. The DRE product may then be measured by mass spectrometry. In certain embodiments, the incubation may be terminated by methanol precipitation of the enzyme and the supernatant containing the DRE product may be analyzed directly using mass spectrometry. In certain embodiments, the DRE product is analyzed by liquid chromatography (LC) or another purification technique (e.g., capillary electrophoresis) coupled with tandem mass spectrometry (MS/MS) to measure the DRE-product.

The amount of ADAMTS13 activity in a sample may be determined using an internal standard. For example, using isotope dilution mass spectrometry, a stable isotope-labeled analogue of the cleavage product (for example, of DRE product) is added to the sample as an internal standard and is measured concurrently with the enzymatic cleavage product by MS or LC-MS/MS, to normalize for variation. In an embodiment, the internal standard may be added concurrently with the synthetic substrate peptide. In other embodiments, the internal standard may be added after cleavage of the synthetic substrate by ADAMTS13. In an embodiment, the measured analyte:internal standard ratio is proportional to the amount of DRE-product formed and, thereby, directly proportional to the ADAMTS13 activity. Accordingly, the measured analyte:internal standard ratio is indicative of the amount of ADAMTS13 enzymatic activity present in the sample. ADAMTS13 activity can be expressed in units of "Percent Normal Activity," with 100% Normal Activity defined, for example, by pooled plasma derived from the patients having normal ADAMTS13 activity levels.

The methods according to the embodiments of the present invention may comprise providing a sample. In this context, the term "providing" is to be construed broadly. The term is not intended to refer exclusively to a subject who provided a biological sample. For example, a technician in an off-site clinical laboratory can be said to "provide" the sample, for example, as the sample is prepared for purification by extraction and/or chromatography.

The sample is not limited to any particular sample type. The sample contains ADAMTS13, but, in general, also includes other components. In some embodiments, the sample is a sample that has been processed and prepared for purification by extraction and/or chromatography. Such processing may be useful for optimizing the effectiveness of subsequent purification steps. Such processing methods are well known to those of skill in the art.

The invention is not limited to any particular means of sample handling. In some embodiments, it may be useful to separate the sample into two or more fractions prior to partial purification by extraction and/or chromatography. In some such embodiments, two or more of such fractions may be prepared differently, for example, to help improve the sensitivity or selectivity of the separation for a particular column chemistry. In some embodiments, the method includes preparing a single sample for repeat injections across multiple liquid chromatography systems.

The invention is not limited to any particular sample size or composition. In some embodiments, the sample comprises a biological sample. In such embodiments, the sample may also include other components, such as solvents, buffers, anticlotting agents and the like. In embodiments where the sample comprises a biological sample, the biological sample can be one or more of whole blood, plasma, serum, urine, cerebrospinal fluid, tissue homogenate, saliva, amniotic fluid, bile, mucus, peritoneal fluid, or lymphatic fluid. The invention is not limited to any particular volume of biological sample. In some embodiments, the biological sample is at least about 0.5-250 µL, at least about 1-100 µL, or at least about 2-50 µL in volume. In certain embodiments, the biological sample is at least about 2-50 µL in volume.

Termination of the enzymatic cleavage in the sample being incubated is not limited to any particular method. In some embodiments, termination of the enzymatic cleavage by ADAMTS13 in the sample is accomplished by adding a precipitating reagent to the sample after the appropriate incubation period, in an amount sufficient to terminate ADAMTS13 enzymatic reaction. A precipitating reagent can be methanol, acetonitrile, acetone, 2-propanol, ammonium sulfate, trichloroacetic acid or perchloric acid. In some embodiments, temperature may be used to effectively terminate the reaction. The sample may be heated so as to inactivate the ADAMTS13 or the sample may be cooled, potentially frozen, to slow the reaction to an effective stop. In some embodiments, the reaction may be stopped by adjusting the sample pH not conducive for ADAMTS13 activity, for example, below about pH 3 or above about pH 9. In other embodiments, the reaction may be stopped by adding inhibitors of ADAMTS13, such as EDTA or other protease inhibitors. In some embodiments, it may not be necessary to terminate the enzymatic reaction. For example, ADAMTS13 enzymatic reaction may be continuously monitored during the incubation step by repeated sampling over the course of time, rather than measurement at a single time point.

Partial purification of the sample provides a partially purified sample. Partial purification can be conducted at various stages of the method. For example, in some embodiments, partial purification can be conducted after incubation of the sample and termination of ADAMTS13 activity, resulting in a sample comprising ADAMTS13 enzymatic cleavage product. In some other embodiments, partial purification can be conducted prior to the incubation step. More than one partial purification step may be used in the methods according to the embodiments of the present invention. Partial purification is not limited by the method or the result of the partial purification. In some embodiments, the concentrations of one or more of the various components in the sample, other than the component of interest, have been reduced. For example, concentration of the other components may be reduced relative to the concentration of enzymatic cleavage product in the partially purified sample. In another example, concentration of the other components may be reduced relative to the concentration of ADAMTS13 in the partially purified sample.

Thus, the term "removing" or "removal" does not necessarily imply the complete removal of a component. Some amount of the removed component can still be present in the partially purified sample, although its concentration relative to that of the component of interest will be lower than in the pre-extraction sample. In some embodiments, the relative concentration of the removed component to that of enzymatic cleavage product in the partially purified sample is no more than 90%, or no more than 75%, or no more than 50%, or no more than 33%, or no more than 25%, or no more than 10% or no more than 5%, or no more than 1%, of its relative concentration to enzymatic cleavage product in the sample prior to the partial purification step. The invention is not limited to any particular type of removed component. In some embodiments, one or more of the removed components is a compound that can interfere with the analysis by mass spectrometry or with liquid chromatography. One example of partial purification method is centrifugation after the termination of the reaction by addition of an organic solvent. During the centrifugation, the precipitated components of thus treated sample are removed, while the supernatant is further purified and/or analyzed.

In some embodiments of the invention, the partially purified sample can undergo one or more processing steps before chromatographic separation. For example, in some embodiments, the partially purified sample is evaporated. Then, the resulting residue is reconstituted in a solvent system. Any suitable solvent system can be used for reconstituting the residue. In some embodiments, the solvent system is a solvent system that is compatible with chromatographic separation. In some embodiments, the solvent system for reconstitution includes, but is not limited to, water, methanol or mixtures thereof. In some other embodiments, the partially purified sample may undergo a chemical or enzymatic treatment so as to modify the enzymatic cleavage product. For example, the cleavage product may be chemically derivatized or further hydrolyzed. In some embodiments, the cleavage product may be further hydrolyzed with other enzymes.

In some embodiments, the methods include (comprise) a step of chromatographically separating polypeptide enzymatic cleavage product, for example, DRE product, using liquid chromatography. The invention is not limited to any particular manner of performing liquid chromatography. In general, the chromatographic separation step includes using at least one liquid chromatography (LC) column. In some embodiments, multiple LC columns are used, such as two or more, or three or more, or four or more LC columns. In some such embodiments two, three, four, five, six, eight or ten LC columns are used. In some such embodiments, two or more of these LC columns are arranged parallel to each other and are connected inline to the same mass spectrometer.

The invention is not limited to any particular types of columns. Any column suitable for the separation of enzymatic cleavage product can be used. In some embodiments, one or more analytical columns are used. In some embodiments, the column is a C18 column, but could be comprised of C12, C8, C4, Phenyl-hexyl, amide, amine, or PFP.

Further, the invention is not limited to any particular mobile phase. Any suitable mobile phase can be used, as long as the mobile phase is suitable for use with a particular LC column and for chromatographically separating enzymatic cleavage product in the LC column. In some embodiments, the mobile phase is comprised of acetonitrile (0-100%). Or, the mobile phase may be comprised of methanol (0-100%). In some such embodiments, the mobile phase employs a gradient, such that the relative ratios of two or more solvents are varied over time. In some embodiments, the mobile phase is comprised of ion pairing reagents, such as trifluoroacetic acid, formic acid, ammonium, heptafluorobutyric acid, and/or acetic acid.

In certain embodiments, two or more LC columns can be used in parallel and connected inline to the same mass spectrometer, e.g., to improve throughput. In some such embodiments, a sample (which can be a partially purified sample) is introduced to the two or more LC columns at different times. In some embodiments, the introduction of the test sample to the two or more LC columns is staggered, meaning that there is a pre-determined time interval separating the introduction of sample to two or more LC columns. Appropriate time intervals can be selected based on various factors, including the elution time, column chemistries and the potential need to avoid interfering with the analysis of the enzymatic cleavage product eluted from one or more of the other LC columns.

In some embodiments of the invention, an LC column can be placed in series with another column. For example, in some embodiments, suitable guard columns can be employed. Those of skill in the art are able to select appropriate guard columns for use in the present methods. In some embodiments, a guard column is placed in parallel with another LC column. Such series of two or more columns can also be arranged in parallel, such that there are two or more series of columns operating in parallel, where each series contains two or more columns. In other embodiments, online extraction columns may be employed. For example, online solid phase extraction columns may be used in some embodiments of the method.

In some embodiments of the invention, the enzymatic cleavage product may be purified by electrophoresis. For example, in some embodiments, the enzymatic cleavage product is separated from potentially interfering substances using capillary electrophoresis.

In some embodiments, the methods comprise analyzing the purified or separated enzymatic cleavage product by mass spectrometry to determine the presence or amount of the enzymatic cleavage product. In some embodiments, two or more of the LC columns feed into the same mass spectrometer. In some further embodiments, three or more of the LC columns feed into the same mass spectrometer. In some embodiments, the mass spectrometer is part of a combined LC-MS system.

The invention is not limited to any particular type of mass spectrometer. Any suitable mass spectrometer can be used. In some embodiments, the method employs a tandem mass spectrometer. In some such embodiments, analyzing enzymatic cleavage product can include, ionizing enzymatic cleavage product, analyzing the ionized enzymatic cleavage product, fragmenting the enzymatic cleavage product ion into two or more fragment ions, and analyzing the fragment ions.

The invention is not limited to a mass spectrometer using any particular ionization methods. The method may utilize ionization techniques suitable to the generation of multiply charged ions from the enzymatic cleavage product. Suitable ionization methods include, but are not limited to photoionization, electrospray ionization, atmospheric pressure chemical ionization, and electron capture ionization. And in embodiments that employ fragmenting, any suitable fragmentation technique can be used. Suitable techniques include, but are not limited to collision induced dissociation, electron capture dissociation, electron transfer dissociation, infrared multiphoton dissociation, radiative dissociation, electron-detachment dissociation, and surface-induced dissociation.

In some embodiments, the tandem mass spectrometer is a MDS-Sciex API5500 triple quadrupole mass spectrometer. In some embodiments, the tandem mass spectrometer has an atmospheric pressure ionization source, and the analyzing step comprises an ionization method selected from the group consisting of photoionization, electrospray ionization (ESI), atmospheric pressure chemical ionization (APCI), electron capture ionization, electron ionization, fast atom bombardment/liquid secondary ionization (FAB/LSI), field ionization, field desorption, thermospray/plasmaspray ionization, particle beam ionization, and so-called "hybrid ionization" techniques, such as laser ablation electrospray ionization (LAESI), desorption electrospray ionization (DESI) or matrix assisted laser desorption electrospray ionization (MALDESI). The ionization method may be in positive ion mode or negative ion mode. The analyzing step may also include multiple reaction monitoring (MRM, also referred to as selected reaction monitoring or SRM) or selected ion monitoring (SIM), and the two or more biomolecules are analyzed simultaneously or sequentially. In some embodiments, the analyzing step uses a quadrupole analyzer. In some embodiments, the mass spectrometer is a triple quadrupole mass spectrometer. In some embodiments, the analyzing step may be performed with product ion scanning on quadrupole-time-of-flight (Q-TOF) or quadrupole-orbitrap instrument, such as in parallel reaction monitoring (PRM).

The methods, in some embodiments, include using an internal standard. In such embodiments, the internal standard can be introduced at any suitable point prior to the ionization step. Any suitable internal standard can be used. In some embodiments, the internal standard is stable isotopically-labeled equivalent of the enzymatic cleavage product. In some such embodiments, the internal standard is labeled by stable isotopic enrichment of one or more amino acids. For example, in some embodiments the internal standard is the DRE peptide having [$^{13}$C, $^{15}$N]-Leucine. Or, other isotopes used and/or amino acids may be labeled.

In some embodiments, the amount of ADAMTS13 enzymatic activity in the sample need not be quantified. In some embodiments, the method can be used to determine the presence or absence of ADAMTS13 enzymatic activity in a sample. In other embodiments, the method is used to determine the amount of ADAMTS13 enzymatic activity in a sample. For example, in some embodiments and/or aspects, the invention provides methods for determining an amount of ADAMTS13 activity in a sample, comprising the steps of incubating the sample with a synthetic peptide substrate for ADAMTS13 (and an internal standard) under conditions allowing for enzymatic cleavage of the synthetic peptide substrate by ADAMTS13, optionally terminating the enzymatic cleavage in the sample being incubated, optionally chromatographically separating an enzymatic cleavage product and the internal standard from other components of the sample using liquid chromatography, and ionizing the enzymatic cleavage product and the internal standard to generate multiply charged ions that are analyzed by mass spectrometry to determine the amount of enzymatic cleavage product and the internal standard in the sample, wherein a ratio of the determined amounts of the enzymatic cleavage product and the internal standard is indicative of the amount of activity of ADAMTS13 in the sample.

In some embodiments, the method is not limited by any lower-limit of quantification (LLOQ) and/or upper-limit of quantification (ULOQ). In some embodiments, the LLOQ is 2% and the ULOQ is 100%.

The amount of activity in the sample may be determined by comparison to an external standard curve. For example, the quantity of DRE peptide may be compared to an external standard curve of calibration standard generated using pooled normal plasma having approximately 100% ADAMTS13 that is serial diluted (e.g., to 2% ADAMTS13 activity). The method is not limited to a specific number of calibration levels. In some embodiments, only a single point is need to generate the calibration curve. In some embodiments, the calibrator may added into the sample.

Methods of Generating Reports

In at least one aspect, the invention provides methods for generating a report for diagnosing a disease or condition associated with reduced activity of ADAMTS13 in a subject. One example of such disease or condition is TTP. Such a method may include the steps of incubating the sample with a synthetic peptide substrate for ADAMTS13 and an internal standard product peptide under conditions allowing for enzymatic cleavage of the synthetic peptide substrate by ADAMTS13, optionally terminating the enzymatic cleavage in the sample being incubated, optionally chromatographically separating an enzymatic cleavage product and the internal standard from other components of the sample using liquid chromatography, ionizing the enzymatic cleavage product and the internal standard to generate multiply charged ions that are analyzed by mass spectrometry to determine the amount of enzymatic cleavage product and the internal standard in the sample, wherein a ratio of the determined amounts of the enzymatic cleavage product and the internal standard is indicative of the amount of activity of ADAMTS13 in the sample, and generating a report that recites the amount of activity of ADAMTS13 in the sample.

Based on the information on the amount of activity of ADAMTS13 in the sample, one could assess whether a subject has an abnormally low amount of such activity. Such information can be useful for diagnosing one or more diseases or disorders that may be associated with aberrant levels of ADAMTS13 activity in a subject. The features and embodiments of all steps except the steps of generating the report are described immediately above. As noted above, the method can employ more than one column, e.g., two or more columns in parallel connected inline to the same mass spectrometer.

In an embodiment, an ADAMTS13 activity level below 10% is highly indicative of thrombotic thrombocytopenic purpura (TTP), but in certain embodiments should not be used as the sole diagnostic procedure without confirmation of the diagnosis by another medically established diagnostic product or procedure. Conversely, an ADAMTS13 activity level greater than 10% may not completely exclude clinical diagnosis of TTP. As many as 40% of patients with clinically diagnosed TTP have ADAMTS13 levels greater than 10%. Other conditions that could have normal or mild to moderate deficiency of ADAMTS13 activity include hemolytic uremic syndrome (HUS), atypical hemolytic uremic syndrome (aHUS), and other thrombotic microangiopathies associated with hematopoietic stem cell and solid organ transplantation, liver disease, DIC, sepsis, pregnancy or effects of certain medications (e.g., ticlopidine, clopidogrel, cyclosporine, mitomycin C, quinine).

In some embodiments, an ADAMTS13 activity measurement may be used to determine the presence and/or amount of ADAMTS13 inhibitor in the sample. By mixing at a known ratio a sample with known low activity with a sample with known normal activity, the activity of the resulting mixed sample may be measured. Based on the known ratio of the mixture and known activity of the individual samples, one can compare the measured activity in the mixture to the expected activity in the mixture, whereby a measured activity lower than the expected activity is indicative of the presence and amount of inhibitor in the low activity sample. In some instances, the low activity sample may be heat inactivated.

Systems

In another aspect, the invention provides systems for determining the presence or amount of ADAMTS13 activity in a sample. For example, a system comprises a station for incubating the sample with a synthetic peptide substrate for ADAMTS13 under conditions allowing for enzymatic cleavage of the synthetic peptide substrate by ADAMTS13, and a station for multiply charging (i.e., ionizing) and analyzing the enzymatic cleavage product by mass spectrometry to determine the amount of the enzymatic cleavage product in the sample, wherein the amount of the enzymatic cleavage product is indicative of the activity of ADAMTS13 in the sample. The system may also comprise a station for chromatographically separating an enzymatic cleavage product using liquid chromatography or other separation methods (e.g., capillary electrophoresis).

Such systems can include various embodiments and sub-embodiments analogous to those described above for methods according to the embodiments of the present invention. These systems include various stations. As used herein, the term "station" is broadly defined and includes any suitable apparatus or collections of apparatuses suitable for carrying out the recited method. The stations need not be integrally connected or situated with respect to each other in any particular way. The invention includes any suitable arrangements of the stations with respect to each other. For example, the stations need not even be in the same room. But in some embodiments, the stations are connected to each other in an integral unit.

The methods and systems according to the embodiments of the present invention possess various advantages. For example, the use of LC-MS/MS in the methods and systems of the present invention is particularly advantageous. Previous assays of ADAMTS13 have employed either immunoassay procedures (Kato et al., 2006, *Transfusion* 46:1444-1452), fluorescence resonance energy transfer (FRET) (Kokame et al., *Br. J. Hematol.*, 2005, 129:93-100, or (SELDI-TOF)-mass spectrometry (Jin et al., *J. Thrombosis and Haemostasis*, 2006, 4:333-338). The methods and systems described herein provide increased sensitivity (e.g., LLOQ of 2%), and specificity as compared to immunoassay, increased throughput and reduced cost as compared to FRET, and increased specificity due to the generation of multiply-charged ions by electrospray ionization, which facilitates analysis by tandem mass spectrometry as compared e.g., to (SELDI-TOF)-MS.

Non-Limiting Embodiments

Non-limiting embodiments include:
1. A method for determining a disintegrin and metalloproteinase with a thrombospondin type 1 motif, member 13 (ADAMTS13) enzyme activity in a sample, comprising:
  (a) incubating the sample with an exogenous peptide substrate for ADAMTS13 under conditions allowing for enzymatic cleavage of the exogenous peptide substrate by ADAMTS13 to produce an enzymatic cleavage product;
  (b) ionizing the enzymatic cleavage product to generate a multiply charged gas-phase ion of said cleavage product; and,
  (c) analyzing said multiply charged gas-phase ion by mass spectrometry to determine the presence or amount of enzymatic cleavage product in the sample, wherein the presence or the amount of the product of the enzymatic cleavage product in the sample is indicative of the presence or the amount of the activity of ADAMTS13 in the sample.

2. The method of paragraph 1, further comprising, after step (a) but prior to step (b), a step of partially purifying the enzymatic cleavage product, and wherein step (b) is performed on the partially purified enzymatic cleavage product.

3. The method of paragraph 2, wherein the step of partially purifying the enzymatic cleavage product comprises centrifugation, and wherein step (b) is performed on a supernatant comprising the enzymatic cleavage product.

4. The method of paragraph 2, wherein the step of partially purifying the enzymatic cleavage product comprises liquid chromatography to generate an eluent comprising the enzymatic cleavage product, and wherein step (b) is performed on the eluent.

5. The method of paragraph 2, wherein the step of partially purifying the enzymatic cleavage product comprises capillary electrophoresis to generate an eluent comprising the enzymatic cleavage product, and wherein step (b) is performed on the eluent.

6. The method of paragraph 2, wherein the step of partially purifying the enzymatic cleavage product comprises solid phase extraction to generate an eluent comprising the enzymatic cleavage product, and wherein step (b) is performed on the eluent.

7. The method of paragraph 2, wherein the step of partially purifying the enzymatic cleavage product comprises filtration to generate an eluent comprising the enzymatic cleavage product, and wherein step (b) is performed on the eluent.

8. The method of paragraph 2, wherein the step of partially purifying the enzymatic cleavage product comprises filtration to generate a retained fraction comprising the enzymatic cleavage product, and wherein step (b) is performed on the retained fraction.

9. The method of paragraph 2, wherein the step of partially purifying the enzymatic cleavage product comprises the use of affinity enrichment of the enzymatic cleavage product, and wherein step (b) is performed on the affinity enriched enzymatic cleavage product.

10. The method of paragraph 9, wherein the affinity enrichment technique uses an immobilized meatal affinity resin.

11. The method of paragraph 9, wherein the affinity enrichment technique utilizes an antibody.

12. The method of paragraph 9, wherein the affinity enrichment technique utilizes a fragment of an antibody, such as a Fab fragment.

13. The method of paragraph 9, wherein the affinity enrichment technique utilizes streptavidin.

14. The method of paragraph 9, wherein the affinity enrichment technique utilizes protein-G.

15. The method of paragraph 9, wherein the affinity enrichment technique utilizes protein-A.

16. The method of paragraph 9, wherein the affinity enrichment technique utilizes an aptamer 17. The method of paragraph 1, further comprising, between step (a) and (b), and optionally prior to the partial purification step of paragraph 2, a step of terminating the enzymatic cleavage in the sample being incubated.

18. The method of paragraph 17, wherein the terminating step comprises adding a precipitating reagent to the sample being incubated.

19. The method of paragraph 18, wherein the precipitating reagent comprises methanol.

20. The method of paragraph 18, wherein the precipitating reagent comprises acetonitrile.

21. The method of paragraph 18, wherein the precipitating reagent comprises acetone.

22. The method of paragraph 18, wherein the precipitating reagent comprises 2-propanol 23. The method of paragraph 18, wherein the precipitating reagent comprises sulfate.

24. The method of paragraph 18, wherein the precipitating reagent comprises trichloroacetic acid 25. The method of paragraph 18, wherein the precipitating reagent comprises perchloric acid 26. The method of paragraph 17, wherein the terminating step comprises adjusting the pH of the sample being incubated below pH 5.

27. The method of paragraph 17, wherein the terminating step comprises adjusting the pH of the sample being incubated above pH 9.

28. The method of paragraph 17, wherein the terminating step comprises heating the sample being incubated to a temperature above 50 degrees centigrade.

29. The method of paragraph 17, wherein the terminating step comprises cooling the sample being incubated to a temperature below 15 degrees centigrade.

30. The method of paragraph 17, wherein the terminating step comprises adding an inhibitor of ADAMTS13 to the sample being incubated.

31. The method of paragraph 30, wherein the inhibitor is ethylenediaminetetraacetic acid.

32. The method of paragraph 1, wherein the exogenous substrate is a synthetic peptide having at least 70% sequence similarity to amino acid sequence of vWF73.

33. The method of paragraph 1, wherein the exogenous peptide substrate has at least 70% sequence similarity to von Willebrand Factor sequence.

34. The method of paragraph 1, wherein the exogenous peptide substrate comprises a cleavage site for ADAMTS13.

35. The method of paragraph 1, wherein the synthetic peptide substrate comprises one or more affinity tags.

36. The method of paragraph 35, wherein the one or more affinity tags are selected from the group consisting of: MYC-tag, FLAG-tag, polyHis-tag and GST-tag.

37. The method of paragraph 35, wherein the one or more affinity tags contain the epitope for an antibody.

38. The method of paragraph 1, wherein the exogenous peptide substrate comprises one or more non-natural amino acids.

39. The method of paragraph 38, wherein the one or more non-natural amino acids are biotinylated.

40. The method of paragraph 38, wherein the one or more non-natural amino acids are stable isotopically labeled amino acids.

41. The method of paragraph 1, wherein the enzymatic cleavage product comprises a polypeptide having a sequence of DREQAPNLVY.

42. The method of paragraph 1, wherein step (b) includes ionizing the enzymatic cleavage product using an ionization technique selected from the group consisting of electrospray ionization, atmospheric pressure chemical ionization and atmospheric pressure photoionization.

43. The method of paragraph 1, wherein the analyzing step (c) uses tandem mass spectrometry 44. The method of paragraph 1, wherein the analyzing step (c) uses ions having a m/z selected from the group consisting of 602.8±2, 182.1±2, 281.1±2, 462.7±2, 512.3±2, 600.3±2, 605.3±2, 811.4±2, 924.5±2 and 1023.5±2.

45. The method of paragraph 1, wherein the analyzing step (c) includes determining the specific activity of the ADAMTS13.

46. The method of paragraph 1, wherein an internal standard is added prior to the ionization step (b).

47. The method of paragraph 46, wherein the internal standard is added concurrently with the substrate.

48. The method of paragraph 46, wherein the internal standard is added to the sample prior to the incubation step (a).

49. The method of paragraph 46, wherein the internal standard is added to the sample being incubated.

50. The method of paragraph 46, where the internal standard is an isotopically labelled equivalent of the enzymatic cleavage product.

51. The method of paragraph 46, wherein the presence or amount of the internal standard is determined along with the presence or amount of the enzymatic cleavage product in step (c).

52. The method of paragraph 51, wherein the ratio between the determined amount of the internal standard and the determined amount of the enzymatic cleavage product is indicative of the amount of the enzymatic cleavage product formed in step (a).

53. The method of paragraph 51, wherein the ratio between the determined amount of the internal standard and the determined amount of the enzymatic cleavage product is indicative of the amount of activity of ADAMTS13 in the sample.

54. The method of paragraph 1, wherein the sample is a biological fluid obtained from a patient.

55. The method of paragraph 54, wherein the biological fluid is plasma.

56. The method of paragraph 54, wherein the biological fluid is serum.

57. The method of any one of paragraphs 1, 2 and 17, further comprising, between steps (a) and (b), and optionally either before or after the partial purification step, but after the termination step, a step of modifying the molecular structure of the enzymatic cleavage in the sample being incubated.

58. The method of paragraph 57, wherein the modifying step comprises further hydrolyzing the enzymatic cleavage product.

59. The method of paragraph 58, wherein the hydrolysis is performed using an enzyme.

60. The method of paragraph 59, wherein the enzyme is trypsin.

61. The method of paragraph 59, wherein the enzyme is pepsin.

62. The method of paragraph 59, wherein the enzyme is LysC.

63. The method of paragraph 59, wherein the hydrolysis is performed using a chemical reagent.

64. The method of paragraph 63, wherein the chemical reagent is formic acid.

65. The method of paragraph 63, wherein the chemical reagent is cyanogen bromide.

66. The method of paragraph 57, wherein the enzymatic cleavage product is derivatized.

67. The method of paragraph 66, wherein the derivatization is enzymatically catalyzed.

68. The method of paragraph 66, wherein the derivatization is chemical addition.

69. A method for determining an amount of activity of enzyme disintegrin and metalloproteinase with a thrombospondin type 1 motif, member 13 (ADAMTS13) in a sample, comprising:
   (a) incubating the sample with a synthetic peptide substrate for ADAMTS13 and an isotopically labelled equivalent of a product peptide to the sample under conditions allowing for enzymatic cleavage of the synthetic peptide substrate by ADAMTS13;
   (b) terminating the enzymatic cleavage in the sample being incubated;
   (c) partially purifying an enzymatic cleavage product and the internal standard from other components of the sample using liquid chromatography or another purification technique; and,
   (d) analyzing the partially purified enzymatic cleavage product and the standard by mass spectrometry to determine the amount of enzymatic cleavage product and the internal standard in the sample, wherein a ratio of the determined amounts of the enzymatic cleavage product and the internal standard is indicative of the amount of activity of ADAMTS13 in the sample.

70. A method of generating a report useful for diagnosing a disease or condition associated with reduced activity of enzyme disintegrin and metalloproteinase with a thrombospondin type 1 motif, member 13 (ADAMTS13) in a sample obtained from a patient, the method comprising performing any of the methods of any of the above paragraphs and generating a report that recites the amount of activity of ADAMTS13 in the sample.

71 The method of paragraph 70, wherein the disease or the condition is thrombotic thrombocytopenia purpura.

72. A method for diagnosing thrombotic thrombocytopenia purpura in a subject, comprising performing any of the methods of any of the above paragraphs, wherein an ADAMTS13 activity level below 10% normal values is highly indicative of thrombotic thrombocytopenia purpura (TTP).

73. A system for determining activity of enzyme disintegrin and metalloproteinase with a thrombospondin type 1 motif, member 13 (ADAMTS13) in a sample, the system comprising:
   (a) a station for incubating the sample with an exogenous peptide substrate for ADAMTS13 under conditions allowing for enzymatic cleavage of the exogenous peptide substrate by ADAMTS13 to generate an enzymatic cleavage product;
   (b) a station for ionizing the enzymatic cleavage product to generate a multiply charged gas-phase ion of said cleavage product; and,
   (c) a station for analyzing the multiply charged gas phase ion by mass spectrometry to determine the presence and/or amount of the enzymatic cleavage product in the sample, wherein the amount of the enzymatic cleavage product is indicative of the activity of ADAMTS13 in the sample.

74 The system of paragraph 73, further comprising a station for chromatographically separating the enzymatic cleavage product using liquid chromatography.

The following Example has been included to provide guidance to one of ordinary skill in the art for practicing representative embodiments of the presently disclosed subject matter. In light of the present disclosure and the general level of skill in the art, those of skill can appreciate that the following Example is intended to be exemplary only and that numerous changes, modifications, and alterations can be employed without departing from the scope of the presently disclosed subject matter.

Example

ADAMTS13 activity is determined by incubating patient plasma with a synthetic substrate under optimized (i.e., non-physiological) conditions. The synthetic substrate, termed vWF73, is a 73 amino acid residue peptide derived from the natural amino acid sequence of vWF residues Aspartic acid-1596 through Arginine-1668 and, thereby, possesses the ADAMTS13 cleavage site (Tyrosine-1605/Methionine-1606). Upon cleavage of vWF73 in vitro, a 10 amino acid residue product peptide is formed from the N-terminus of the substrate, the product peptide having the sequence DREQAPNLVY (SEQ ID NO:4). ADAMTS13 activity is proportional to the amount of product peptide created during a 30 min incubation, which is measured by isotope dilution following methanol precipitation using liquid chromatography (LC) coupled with tandem mass spectrometry (MS/MS). The assay is externally calibrated using pooled plasma derived from clinically normal individuals and standardized against the WHO 1st International Standard for ADAMTS13 in Plasma (12/252). The standardized ADAMTS13 activity, expressed in units of "percent normal activity," is interpolated from the external calibration curve created from dilution of the pooled normal plasma using with a synthetic matrix to span 2 to 100% normal activity.

Specimens

A recommended sample is 0.1-0.8 mL serum or plasma dispensed in buffered sodium citrate. About 10-20 µL is used for each assay. Serum collected using standard sampling tubes or tubes containing separating gel. Serum/Plasma should be removed from the cells within one hour of collection and transferred to a plastic transport tube. Serum and plasma should be stored frozen at −20° C. until used.

Reagent Preparation

For the ADAMTS13 assay, Generation Buffer (10 mM Bis-Tris, 10 mM Calcium chloride, pH 6.0) is used.

A stock solution of the DRE peptide at 50 µg/mL and Internal Standard (IS), NH2-DREQAPNL*VY-OH (SEQ ID NO: 5) L*=[$^{15}$N, $^{13}$C6]-Leucine) (SIL.vWF10) is made by adding 1 mL of 0.001% Zwittergent 3-16 directly to a single 0.5 mg vial of NAT.vWF10 or SIL. vWF10 to produce 50 µg/mL concentration. The solution is mixed and kept at room temperature for at least 15 min prior to use. The solution is used within 2 hours or frozen and is stable at <−70° ° C. for up to 2 years.

A stock substrate solution of the substrate peptide (vWF73) is purchased directly from the manufacturer in 30% acetonitrile, 0.1% formic acid with a concentration assignment by amino acid analysis (typically, 100 to 1000 µmol/L). The stock substrate can be stored at <−70° ° C. for up to 2 years.

The sequence of vWF73 is shown below and in FIGS. 1-3.

```
                                          (SEQ ID NO: 3)
NH2-DREQAPNLVYMVTGNPASDEIKRLPGDIQVVPIGVG
PNANVQELERIGWPNAPILIQDFETLPREAPDLVLQR-OH.
```

A Working Substrate-Internal Standard Mixture (900 nmol/L vWF73, 50 ng/ml) (SIL.vWF10) is made by appropriately diluting the stock solutions into 0.001% Zwittergent 3 16. It is stored at <−70° ° C. for up to 3 months. The aliquots are discarded after 2 freeze/thaws.

A Working System Suitability Test Solution (10 ng/mL NAT.vWF10) in 0.001% Zwittergent 3-16 is made. It is stored at <−70° C. for up to 2 years.

A Blank Matrix (60 mg/mL BSA in PBS) is made.

Pooled Normal Plasma (PNP) is used to generate low and mid quality cut-off controls. To make the PNP, five replicate specimens from 20 ostensibly normal individuals are collected into 3.2% Sodium citrate tubes (a total of 100 specimens). The specimens are processed per normal procedure, discarding any hemolyzed specimens, pooled and used immediately or frozen. They are stored at <−70° C. for up to 2 months. To prepare Heat Inactivated Pooled Normal Plasma (HIPNP), 10 to 50 mL aliquots of PNP are incubated for 12 to 16 hours at 56° C. in a water bath. The HIPNP may be stored refrigerated (2-8° C.) for up to 1 week or at <−10° C. for up to 1 year.

Calibration and Reference Standards

The quantity of DRE peptide is compared to an external standard curve of calibration standard generated using PNP having 100% ADAMTS13 that is serial diluted to 2% ADAMTS13 Activity. An acceptable calibration curve fitting is defined as being between 85 and 115% throughout the range. Additional standardization employs the WHO 1st International Standard for ADAMTS13 in plasma as a reference standard, which, when undiluted, exhibits 91.0% activity. The mean recovery for the reference standard should be between 90 and 110%. The reference standard recovery is used to adjust the calibrator values accordingly. For example, if the reference standard recovery is 112.3%, than the assigned valued for a 20% calibrator would be 17.81% (20%/1.123).

Matrix Controls

The following matrix controls (QCs) are prepared in pooled normal plasma (PNP). The lot of PNP used in preparation of the QCs should differ from the lot of PNP used in working calibrators.

Low QC is made by diluting PNP with HI-PNP to have a mean ADAMTS13 activity between 5-15% of normal (i.e., PNP). Mid QC is made by adding ADAMTS13 antibody into PNP to create about a 1:50 antibody mixture, then diluting (with additional PNP) to identify a dilution with between 20-40% ADAMTS13 activity.

ADAMTS13 Assay Procedure

A water bath is preheated to 45° C. (±3° C.), and blanks, standards, controls, samples, and frozen reagents are thawed under ambient conditions. Aliquots of 13 µL of the blanks, standards, controls and samples are pipetted into separate wells of a 1.2-mL, 96 deep well plate, (Plate A). Next, aliquots of 923 µL of Generation Buffer are pipetted into each well of Plate A. The plate is then sealed (e.g., with foil) and vortexed to mix the reagents.

At this point, an aliquot (25 µL) of Working Substrate/Internal Standard Mixture is added into matching wells of a new 1.2-mL, 96 deep well plate (i.e., Plate B). Both plates include wells for the double blank (0.001% Zwittergent 3-16). At this point, 25 L of diluted samples from Plate A are transferred to the Working Substrate/Internal Standards in Plate B. Plate B is then sealed (e.g., with an adhesive sealant) and subjected to centrifugation and vortexing to ensure complete transfer and mixing. Plate B is then incubated in a 45° C. (±3° C.) water bath for 30 min (+1 min). Plate B is then centrifuged and 250 µL of methanol added to each well to terminate the reaction.

At this point the samples are ready for LC/MS-MS analysis. After sealing the wells (e.g., with foil) the samples (i.e., Plate B) are vortexed (5 min) and centrifuges (e.g., 10 min at about 3250 rpm). Aliquots of each sample (200 µL) of supernatant are then transferred from Plate B to a new plate, Plate C. After sealing (e.g., with foil), the samples are cooled and subjected to LC-MS/MS. LC employs a reverse phase C18 stationary phase with an acetonitrile gradient. The loading includes a second pump to apply additional aqueous reagent to improve loading. DMSO may be included in the acetonitrile gradient. MS/MS employs two qualifiers (i.e., additional fragments) to ensure the quantifier signal is not compromised by a contaminant(s), as shown in Table 1.

TABLE 1

Analyte and internal standard detection

| Analyte/Internal Standard | Quantifier | Qualifier A | Qualifier B |
|---|---|---|---|
| Analyte Name | ADAMTS13 Activity | ADAMTS13 qual-A | ADAMTS13 qual-B |
| Analyte Transitions (m/z) | 602.801/924.453 | 602.801/811.369 | 602.801/512.265 |
| Internal Standard Name | IS | IS qual-A | IS qual-B |
| Internal Standard Transitions | 606.310/931.471 | 606.310/811.369 | 606.310/515.773 |

Analytical Measurable Range

The lower (LLOQ) and upper (ULOQ) limit of quantification as determined in validation are listed below in Table 2.

TABLE 2

Limits of quantification

| LLOQ | ULOQ |
|---|---|
| 2% | 100% |

Clinically Reportable Range

The lower (LRL0 and upper (URL) reportable limits as determined in validation are listed below in Table 3.

TABLE 3

Reportable limits

| LRL | URL |
|---|---|
| 2% | 1000% |

REFERENCE INTERVAL & INTERPRETATION

The normal reference interval established during validation of the assay to be: >66% Normal ADAMTS13 Activity. Levels less than 66% are suggestive of an underlying condition.

While the preferred embodiments of the invention have been illustrated and described, it will be appreciated that various changes can be made therein without departing from the spirit and scope of the invention. All printed patents and publications referred to in this application are hereby incorporated herein in their entirety by this reference.

The official copy of the sequence listing is submitted electronically via EFS-Web as an XML formatted sequence listing with a file named 1435408 LC-2016-DIV.xml, created on May 26, 2025, and having a size of 12.8 kilobytes. The sequence listing contained in this XML document is part of the specification and is herein incorporated by reference in its entirety.

SEQUENCE LISTING

```
Sequence total quantity: 8
SEQ ID NO: 1               moltype = AA   length = 2050
FEATURE                    Location/Qualifiers
source                     1..2050
                           mol_type = protein
                           organism = Homo sapiens
SEQUENCE: 1
SLSCRPPMVK LVCPADNLRA EGLECTKTCQ NYDLECMSMG CVSGCLCPPG MVRHENRCVA    60
LERCPCFHQG KEYAPGETVK IGCNTCVCQD RKWNCTDHVC DATCSTIGMA HYLTFDGLKY   120
LFPGECQYVL VQDYCGSNPG TFRILVGNKG CSHPSVKCKK RVTILVEGGE IELFDGEVNV   180
KRPMKDETHF EVVESGRYII LLLGKALSVV WDRHLSISVV LKQTYQEKVC GLCGNFDGIQ   240
NNDLTSSNLQ VEEDPVDFGN SWKVSSQCAD TRKVPLDSSP ATCHNNIMKQ TMVDSSCRIL   300
TSDVFQDCNK LVDPEPYLDV CIYDTCSCES IGDCACFCDT IAAYAHVCAQ HGKVVTWRTA   360
TLCPQSCEER NLRENGYECE WRYNSCAPAC QVTCQHPEPL ACPVQCVEGC HAHCPPGKIL   420
DELLQTCVDP EDCPVCEVAG RRFASGKKVT LNPSDPEHCQ ICHCDVVNLT CEACQEPGGL   480
VVPPTDAPVS PTTLYVEDIS EPPLHDFYCS RLLDLVFLLD GSSRLSEAEF EVLKAFVVDM   540
MERLRISQKW VRVAVVEYHD GSHAYIGLKD RKRPSELRRI ASQVKYAGSQ VASTSEVLKY   600
TLFQIFSKID RPEASRITLL LMASQEPQRM SRNFVRYVQG LKKKKVIVIP VGIGPHANLK   660
QIRLIEKQAP ENKAFVLSSV DELEQQRDEI VSYLCDLAPE APPPTLPPDM AQVTVGPGLL   720
GVSTLGPKRN SMVLDVAFVL EGSDKIGEAD FNRSKEFMEE VIQRMDVGQD SIHVTVLQYS   780
YMVTVEYPFS EAQSKGDILQ RVREIRYQGG NRTNTGLALR YLSDHSFLVS QGDREQAPNL   840
VYMVTGNPAS DEIKRLPGDI QVVPIGVGPN ANVQELERIG WPNAPILIQD FETLPREAPD   900
LVLQRCCSGE GLQIPTLSPA PDCSQPLDVI LLLDGSSSFP ASYFDEMKSF AKAFISKANI   960
GPRLTQVSVL QYGSITTIDV PWNVVPEKAH LLSLVDVMQR EGGPSQIGDA LGFAVRYLTS  1020
EMHGARPGAS KAVVILVTDV SVDSVDAAAD AARSNRVTVF PIGIGDRYDA AQLRILAGPA  1080
GDSNVVKLQR IEDLPTMVTL GNSFLHKLCS GFVRICMDED GNEKRPGDVW TLPDQCHTVT  1140
CQPDGQTLLK SHRVNCDRGL RPSCPNSQSP VKVEETCGCR WTCPCVCTGS STRHIVTFDG  1200
QNFKLTGSCS YVLFQNKEQD LEVILHNGAC SPGARQGCMK SIEVKHSALS VELHSDMEVT  1260
VNGRLVSVPY VGGNMEVNVY GAIMHEVRFN HLGHIFTFTP QNNEFQLQLS PKTFASKTYG  1320
LCGICDENGA NDFMLRDGTV TTDWKTLVQE WTVQRPGQTC QPILEEQCLV PDSSHCQVLL  1380
LPLFAECHKV LAPATFYAIC QQDSCHQEQV CEVIASYAHL CRTNGVCVDW RTPDFCAMSC  1440
PPSLVYNHCE HGCPRHCDGN VSSCGDHPSE GCFCPPDKVM LEGSCVPEEA CTQCIGEDGV  1500
QHQFLEAWVP DHQPCQICTC LSGRKVNCTT QPCPTAKAPT CGLCEVARLR QNADQCCPEY  1560
ECVCDPVSCD LPPVPHCERG LQPTLTNPGE CRPNFTCACR KEECKRVSPP SCPPHRLPTL  1620
RKTQCCDEYE CACNCVNSTV SCPLGYLAST ATNDCGCTTT TCLPDKVCVH RSTIYPVGQF  1680
WEEGCDVCTC TDMEDAVMGL RVAQCSQKPC EDSCRSGFTY VLHEGECCGR CLPSACEVVT  1740
GSPRGDSQSS WKSVGSQWAS PENPCLINEC VRVKEEVFIQ QRNVSCPQLE VPVCPSGFQL  1800
SCKTSACCPS CRCERMEACM LNGTVIGPGK TVMIDVCTTC RCMVQVGVIS GFKLECRKTT  1860
CNPCPLGYKE ENNTGECCGR CLPTACTIQL RGGQIMTLKR DETLQDGCDT HFCKVNERGE  1920
YFWEKRVTGC PPFDEHKCLA EGGKIMKIPG TCCDTCEEPE CNDITARLQY VKVGSCKSEV  1980
EVDIHYCQGK CASKAMYSID INDVQDQCSC CSPTRTEPMQ VALHCTNGSV VYHEVLNAME  2040
CKCSPRKCSK                                                        2050

SEQ ID NO: 2               moltype = AA   length = 265
FEATURE                    Location/Qualifiers
source                     1..265
                           mol_type = protein
                           organism = Homo sapiens
SEQUENCE: 2
DLAPEAPPPT LPPDMAQVTV GPGLLGVSTL GPKRNSMVLD VAFVLEGSDK IGEADFNRSK    60
EFMEEVIQRM DVGQDSIHVT VLQYSYMVTV EYPFSEAQSK GDILQRVREI RYQGGNRTNT   120
GLALRYLSDH SFLVSQGDRE QAPNLVYMVT GNPASDEIKR LPGDIQVVPI GVGPNANVQE   180
LERIGWPNAP ILIQDFETLP REAPDLVLQR CCSGEGLQIP TLSPAPDCSQ PLDVILLLDG   240
SSSFPASYFD EMKSFAKAFI SKANI                                        265

SEQ ID NO: 3               moltype = AA   length = 210
FEATURE                    Location/Qualifiers
REGION                     1..210
                           note = Synthetic construct
source                     1..210
                           mol_type = protein
                           organism = synthetic construct
SEQUENCE: 3
DLAPEAPPPT LPPDMAQVTV GPGLLGVSTL GPKRNSMVLD VAFVLEGSDK IGEADFNRSK    60
EFMEEVIQRM DVGQDSIHVT VLQYSYMVTV EYPFSEAQSK GDILQRVREI RYQGGNRTNT   120
GLALRYLSDH SFLVSQGDRE QAPNLVYMVT GNPASDEIKR LPGDIQVVPI GVGPNANVQE   180
LERIGWPNAP ILIQDFETLP REAPDLVLQR                                   210

SEQ ID NO: 4               moltype = AA   length = 10
FEATURE                    Location/Qualifiers
REGION                     1..10
                           note = Synthetic construct
source                     1..10
                           mol_type = protein
                           organism = synthetic construct
SEQUENCE: 4
DREQAPNLVY                                                          10
```

```
SEQ ID NO: 5           moltype = AA   length = 10
FEATURE                Location/Qualifiers
REGION                 1..10
                       note = Synthetic construct
SITE                   8
                       note = MISC_FEATURE - X = [13C,15N]-Leucine
source                 1..10
                       mol_type = protein
                       organism = synthetic construct
SEQUENCE: 5
DREQAPNXVY                                                                10

SEQ ID NO: 6           moltype = AA   length = 10
FEATURE                Location/Qualifiers
REGION                 1..10
                       note = Synthetic construct
source                 1..10
                       mol_type = protein
                       organism = synthetic construct
SEQUENCE: 6
EQKLISEEDL                                                                10

SEQ ID NO: 7           moltype = AA   length = 8
FEATURE                Location/Qualifiers
REGION                 1..8
                       note = Synthetic construct
source                 1..8
                       mol_type = protein
                       organism = synthetic construct
SEQUENCE: 7
DYKDDDDK                                                                  8

SEQ ID NO: 8           moltype = AA   length = 6
FEATURE                Location/Qualifiers
REGION                 1..6
                       note = Synthetic construct
source                 1..6
                       mol_type = protein
                       organism = synthetic construct
SEQUENCE: 8
HHHHHH                                                                    6
```

We claim:

1. A system for determining activity of enzyme disintegrin and metalloproteinase with a thrombospondin type 1 motif, member 13 (ADAMTS13) in a sample, the system comprising:
  - a station for incubating the sample with an exogenous peptide substrate for ADAMTS13 under conditions allowing for enzymatic cleavage of the exogenous peptide substrate by ADAMTS13 to generate an enzymatic cleavage product, wherein the exogenous peptide substrate consists of an amino acid sequence with at least 90% sequence identity to SEQ ID NO: 3 and comprises an ADAMTS13 cleavage site;
  - a station for ionizing the enzymatic cleavage product to generate a multiply charged gas-phase ion of the enzymatic cleavage product; and,
  - a station for analyzing the multiply charged gas-phase ion by tandem mass spectrometry to determine presence and/or amount of the enzymatic cleavage product in the sample, wherein the presence or the amount of the enzymatic cleavage product is indicative of the activity of ADAMTS13 in the sample.

2. The system of claim 1, further comprising a station for partially purifying the generated enzymatic cleavage product to generate a partially purified enzymatic cleavage product prior to ionization.

3. The system of claim 2, wherein the station for partially purifying the enzymatic cleavage product comprises one or more components for performing centrifugation to generate a supernatant comprising the partially purified enzymatic cleavage product.

4. The system of claim 2, wherein the station for partially purifying the enzymatic cleavage product comprises one or more components for performing at least one of liquid chromatography, capillary electrophoresis, solid phase extraction, or filtration, to generate an eluent comprising the partially purified enzymatic cleavage product.

5. The system of claim 2, wherein the station for partially purifying the enzymatic cleavage product comprises one or more components for performing filtration to generate a retained fraction comprising the partially purified enzymatic cleavage product.

6. The system of claim 2, wherein the station for partially purifying the enzymatic cleavage product comprises one or more components for performing affinity enrichment of the enzymatic cleavage product to generate an affinity enriched partially purified enzymatic cleavage product.

7. The system of claim 1, wherein the exogenous peptide substrate consists of an amino acid sequence with at least 95% sequence identity to SEQ ID NO:3.

8. The system of claim 1, wherein the enzymatic cleavage product comprises a sequence with at least 70% sequence identity to SEQ ID NO:4.

9. The system of claim 1, wherein the enzymatic cleavage product comprises SEQ ID NO:4.

10. The system of claim 1, wherein the ionizing comprises at least one of electrospray ionization, atmospheric pressure chemical ionization or atmospheric pressure photoionization.

11. The system of claim 1, wherein the station for analyzing analyzes one or more ions having a mass/charge ratio (m/z) of at least one of 602.8±2, 182.1±2, 281.1±2, 462.7±2, 512.3±2, 600.3±2, 605.3=2, 811.4±2, 924.5±2, and/or 1023.5±2.

12. The system of claim 1, wherein the station for analyzing determines a specific activity of ADAMTS13.

13. The system of claim 1, wherein an internal standard is added to the sample a either: (i) prior to the incubating; (ii) during the incubating; or (iii) after the incubating but prior to the ionizing; and wherein presence or amount of the internal standard is determined by the analyzing station along with the presence or the amount of the enzymatic cleavage product.

14. The system of claim 13, wherein the internal standard is an isotopically labelled equivalent of the enzymatic cleavage product.

15. The system of claim 14, wherein a ratio between the amount of the internal standard and the amount of the enzymatic cleavage product is indicative of the amount of the enzymatic cleavage product generated and/or of an amount of the activity of ADAMTS13 in the sample.

16. The system of claim 2, wherein a modification of a molecular structure of the enzymatic cleavage product or the partially purified enzymatic cleavage product is performed after the enzymatic cleavage is terminated.

17. The system of claim 16, wherein the modification of the molecular structure comprises hydrolysis or derivatization.

18. The system of claim 1, further comprising a station for generating a report reciting an amount of the activity of ADAMTS13 in the sample.

19. The system of claim 18, wherein the sample is obtained from a subject or a patient having thrombotic thrombocytopenia purpura.

* * * * *